United States Patent
Uno et al.

(10) Patent No.: US 11,365,285 B2
(45) Date of Patent: Jun. 21, 2022

(54) FLUORINATED ETHER COMPOUND, FLUORINATED ETHER COMPOSITION, COATING LIQUID, ARTICLE AND ITS PRODUCTION METHOD

(71) Applicant: AGC Inc., Chiyoda-ku (JP)

(72) Inventors: Makoto Uno, Chiyoda-ku (JP); Hiromasa Yamamoto, Chiyoda-ku (JP); Taiki Hoshino, Chiyoda-ku (JP); Keigo Matsuura, Chiyoda-ku (JP); Eiichiro Anraku, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 63 days.

(21) Appl. No.: 16/776,609

(22) Filed: Jan. 30, 2020

(65) Prior Publication Data

US 2020/0165385 A1 May 28, 2020

Related U.S. Application Data

(63) Continuation of application No. PCT/JP2018/030223, filed on Aug. 13, 2018.

(30) Foreign Application Priority Data

Aug. 31, 2017 (JP) .............. JP2017-167999

(51) Int. Cl.
| | |
|---|---|
| *C08G 65/00* | (2006.01) |
| *B05D 1/18* | (2006.01) |
| *B05D 5/08* | (2006.01) |
| *C08G 65/336* | (2006.01) |
| *C09D 171/02* | (2006.01) |
| *B05D 1/00* | (2006.01) |

(52) U.S. Cl.
CPC ............. *C08G 65/007* (2013.01); *B05D 1/18* (2013.01); *B05D 1/60* (2013.01); *B05D 5/083* (2013.01); *C08G 65/336* (2013.01); *C09D 171/02* (2013.01); *B05D 2506/10* (2013.01); *C08G 2650/48* (2013.01)

(58) Field of Classification Search
None
See application file for complete search history.

(56) References Cited

U.S. PATENT DOCUMENTS

| 2004/0092675 | A1* | 5/2004 | Moore | C08G 65/007 525/533 |
| 2015/0274888 | A1* | 10/2015 | Sakoh | C08G 65/007 528/392 |
| 2015/0274889 | A1* | 10/2015 | Sakoh | C03C 17/30 428/410 |
| 2016/0304665 | A1* | 10/2016 | Sakoh | C08G 65/336 |
| 2018/0142062 | A1 | 5/2018 | Hoshino et al. | |
| 2019/0217580 | A1* | 7/2019 | Zhou | B32B 17/10715 |
| 2020/0002567 | A1* | 1/2020 | Mitsuhashi | C09D 7/20 |
| 2020/0157376 | A1* | 5/2020 | Hoshino | C08G 65/337 |

FOREIGN PATENT DOCUMENTS

| CN | 108003186 A | * | 5/2018 | |
| WO | WO-2016101185 A1 | * | 6/2016 | .......... C08G 65/328 |
| WO | WO 2017/038832 A1 | | 3/2017 | |
| WO | WO-2017155787 A1 | * | 9/2017 | .......... C09D 183/08 |

OTHER PUBLICATIONS

International Search Report dated Oct. 23, 2018 in PCT/JP2018/030223 filed on Aug. 13, 2018, citing documents AA & AO therein, 2 pages.

* cited by examiner

*Primary Examiner* — Nicole M. Buie-Hatcher
(74) *Attorney, Agent, or Firm* — Oblon, McClelland, Maier & Neustadt, L.L.P.

(57) ABSTRACT

A fluorinated ether compound, a fluorinated ether composition and a coating liquid capable of forming a surface layer excellent in initial water/oil repellency, fingerprint stain removability, abrasion resistance, light resistance and chemical resistance, an article having a surface layer and a method for producing it are provided. The fluorinated ether compound is represented by $A\text{-}O\text{-}(R^{f1}O)_m\text{-}Q^1(R^1)_b$, wherein A is a $C_{1-20}$ perfluoroalkyl group, $R^{f1}$ is a perfluoroalkylene group, m is an integer of from 2 to 500, $(R^{f1}O)_m$ a n d may consist of two or more types of $R^{f1}O$ differing in the number of carbon atoms, $Q^1$ is a (b+1) valent perfluorohydrocarbon group which may have a hydroxy group, $R^1$ is a monovalent organic group having at least one hydrolyzable silyl group, b is an integer of at least 2, and the b $R^1$ may be the same or different.

10 Claims, No Drawings

FLUORINATED ETHER COMPOUND, FLUORINATED ETHER COMPOSITION, COATING LIQUID, ARTICLE AND ITS PRODUCTION METHOD

TECHNICAL FIELD

The present invention relates to a fluorinated ether compound, a fluorinated ether composition, a coating liquid, an article and its production method.

BACKGROUND ART

A fluorinated ether compound having a poly(oxyperfluoroalkylene) chain is capable of forming on a surface of a substrate a surface layer having high lubricity, water/oil repellency, etc. and thus is suitably used for a surface treatment agent. A surface treatment agent containing the fluorinated ether compound is used in an application where it is desired to maintain, for a long period of time, a performance (abrasion resistance) whereby water/oil repellency is less likely to be lowered even if the surface layer is rubbed repeatedly with fingers, and a performance (fingerprint stain removability) whereby a fingerprint adhering to the surface layer can be readily removed by wiping, for example, as a surface treatment agent for a member constituting a plane of a touch panel to be touched with fingers, a spectacle lens, a display of a wearable terminal, etc.

As a fluorinated ether compound which is capable of forming on a surface of a substrate a surface layer excellent in abrasion resistance and fingerprint stain removability, the following has been proposed.

A fluorinated ether compound which has a poly(oxyperfluoroalkylene) chain and two hydrolyzable silyl groups introduced to one terminal of the chain via a branch by a nitrogen atom (Patent Document 1).

PRIOR ART DOCUMENTS

Patent Document

Patent Document 1: WO2017/038832

DISCLOSURE OF INVENTION

Technical Problem

In recent years, a surface layer of e.g. a member constituting a plane to be touched with fingers of a touch panel is required to have further improved abrasion resistance, light resistance and chemical resistance. Accordingly, a fluorinated ether compound capable of forming a surface layer more excellent in abrasion resistance, light resistance and chemical resistance may sometimes be required.

An object of the present invention is to provide a fluorinated ether compound capable of forming a surface layer excellent in initial water/oil repellency, fingerprint stain removability, abrasion resistance, light resistance and chemical resistance; a fluorinated ether composition and a coating liquid containing the fluorinated ether compound; an article having a surface layer excellent in initial water/oil repellency, fingerprint stain removability, abrasion resistance, light resistance and chemical resistance, and a method for producing it.

Another object of the present invention is to provide a fluorinated ether compound useful as an intermediate of a fluorinated ether compound suitably used for a surface treatment agent.

Solution to Problem

The present invention provides a fluorinated ether compound, a fluorinated ether composition, a coating liquid, an article, a method for producing an article, and a fluorinated ether compound according to another embodiment, having the following constructions [1] to [14].

[1] A fluorinated ether compound, which is a compound represented by the following formula 1:

$$A\text{-}O\text{---}(R^{f1}O)_m\text{-}Q^1(R^1)_b \qquad \text{formula 1}$$

wherein A is a $C_{1\text{-}20}$ perfluoroalkyl group, $R^{f1}$ is a perfluoroalkylene group, m is an integer of from 2 to 500, $(R^{f1}O)_m$ may consist of two or more types of $R^{f1}O$ differing in the number of carbon atoms, $Q^1$ is a (b+1) valent perfluorohydrocarbon group in which one or more of fluorine atoms may be substituted by a hydroxy group (provided that the fluorine atom bonded to the carbon atom bonded to $R^1$ is not substituted by a hydroxy group), $R^1$ is a monovalent organic group having at least one hydrolyzable silyl group (excluding one having an etheric oxygen atom), b is an integer of at least 2, and the b $R^1$ may be the same or different.

[2] The fluorinated ether compound according to [1], wherein b is 2, and $Q^1$ is a group represented by the following formula g1, g2 or g3:

$$\begin{array}{c} R^{f3}\!\!-\!\! \\ \diagup \\ -\!\!R^{f2}\!-\!\mathrm{CX} \\ \diagdown \\ R^{f4}\!\!-\!\! \end{array} \qquad \text{formula g1}$$

formula g2 formula g3 wherein X is a fluorine atom, a perfluoroalkyl group or a hydroxy group, $R^{f2}$ is a single bond or a perfluoroalkylene group bonded to the terminal oxygen atom of $(R^{f1}O)_m$, $R^{f3}$ and $R^{f4}$ are a single bond or a perfluoroalkylene group bonded to $R^1$, at least one of $R^{f2}$, $R^{f3}$ and $R^{f4}$ is a perfluoroalkylene group, and when X is a hydroxy group, $R^{f3}$ and $R^{f4}$ are a perfluoroalkylene group bonded to $R^1$.

[3] The fluorinated ether compound according to [1] or [2], wherein $R^1$ is a group represented by the following formula g4:

—Z-Q²[-SiR³$_n$L$_{3-n}$]$_p$  formula g4 wherein Z is a single bond or —C(O)N(R²)—,
$R^2$ is a hydrogen atom or an alkyl group,
$Q^2$ is a (p+1) valent organic group (provided that it is an organic group having no hydrolyzable silyl group nor etheric oxygen atom),
$R^3$ is a monovalent hydrocarbon group,
L is hydrolyzable group,
n is an integer of from 0 to 2,
p is an integer of at least 1, and
when p is at least 2, the p [—SiR³$_n$L$_{3-n}$] may be the same or different.

[4] The fluorinated ether compound according to [3], wherein $Q^2$ is a (p+1) valent hydrocarbon group.

[5] A fluorinated ether composition comprising at least one type of the fluorinated ether compound as defined in any one of [1] to [4], and other fluorinated ether compound.

[6] A coating liquid comprising the fluorinated ether compound as defined in any one of [1] to [4] or the fluorinated ether composition as defined in [5], and a liquid medium.

[7] An article comprising a substrate and a surface layer formed of the fluorinated ether compound as defined in any one of [1] to [4] or the fluorinated ether composition as defined in [5] on a surface of the substrate.

[8] The article according to [7], which has the surface layer on a surface of a member constituting a plane to be touched with fingers of a touch panel.

[9] A method for producing an article, which comprises treating a surface of a substrate by dry coating method using the fluorinated ether compound as defined in any one of [1] to [4] or the fluorinated ether composition as defined in [5] to form a surface layer formed of the fluorinated ether compound or the fluorinated ether composition on the surface of the substrate.

[10] A method for producing an article, which comprises applying the coating liquid as defined in [6] to a surface of a substrate by wet coating method, followed by drying to form a surface layer formed of the fluorinated ether compound or the fluorinated ether composition on the surface of the substrate.

[11] A fluorinated ether compound, which is a compound represented by the following formula 2:

A-O—(R$^{f1}$O)$_m$-Q¹(R$^{1a}$)$_b$  formula 2 wherein A is a $C_{1-20}$ perfluoroalkyl group,
$R^{f1}$ is a perfluoroalkylene group,
m is an integer of from 2 to 500,
(R$^{f1}$O)$_m$ may consist of two or more types of R$^{f1}$O differing in the number of carbon atoms,
$Q^1$ is a (b+1) valent perfluorohydrocarbon group in which one or more of fluorine atoms may be substituted by a hydroxy group (provided that the fluorine atom bonded to the carbon atom bonded to $R^1$ is not substituted by a hydroxy group),
$R^{1a}$ is a monovalent organic group having at least one ω-alkenyl group (provided that it is an organic group having no hydrolyzable silyl group nor etheric oxygen atom),
b is an integer of at least 2, and
the b $R^{1a}$ may be the same or different.

[12] The fluorinated ether compound according to [11], wherein
b is 2, and
$Q^1$ is a group represented by the following formula g1, g2 or g3:

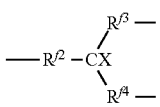
formula g1

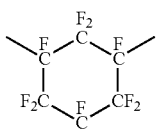
formula g2

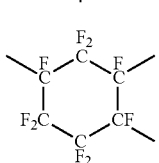
formula g3 wherein X is a fluorine atom, a perfluoroalkyl group or a hydroxy group, R$^{f2}$ is a single bond or a perfluoroalkylene group bonded to the terminal oxygen atom of (R$^{f1}$O)$_m$, R$^{f3}$ and R$^{f4}$ are a single bond or a perfluoroalkylene group bonded to R$^{1a}$, at least one of R$^{f2}$, R$^{f3}$ and R$^{f4}$ is a perfluoroalkylene group, and when X is a hydroxy group, R$^{f3}$ and R$^{f4}$ are a perfluoroalkylene group bonded to $R^1$.

[13] The fluorinated ether compound according to [11] or [12], wherein $R^{1a}$ is a group represented by the following formula g5:

—Z-Q$^{2a}$[-CH=CH₂]$_p$  formula g5 wherein Z is a single bond or —C(O)N(R²)—,
$R^2$ is a hydrogen atom or an alkyl group,
$Q^{2a}$ is a single bond (only when p is 1) or a (p+1) valent organic group (provided that it is an organic group having no hydrolyzable silyl group, no ω-alkenyl group nor etheric oxygen atom), and
p is an integer of at least 1.

[14] The fluorinated ether compound according to [13], wherein the (p+1) valent organic group is a (p+1) valent hydrocarbon group.

Advantageous Effects of Invention

By the fluorinated ether compound of the present invention, it is possible to form a surface layer excellent in initial water/oil repellency, fingerprint stain removability, abrasion resistance, light resistance and chemical resistance.

By the fluorinated ether composition of the present invention, it is possible to form a surface layer excellent in initial water/oil repellency, fingerprint stain removability, abrasion resistance, light resistance and chemical resistance.

By the coating liquid of the present invention, it is possible to form a surface layer excellent in initial water/oil repellency, fingerprint stain removability, abrasion resistance, light resistance and chemical resistance.

The article of the present invention has a surface layer excellent in initial water/oil repellency, fingerprint stain removability, abrasion resistance, light resistance and chemical resistance.

According to the method for producing an article of the present invention, it is possible to produce an article having a surface layer excellent in initial water/oil repellency, fingerprint stain removability, abrasion resistance, light resistance and chemical resistance.

According to another embodiment, the fluorinated ether compound of the present invention is useful as an intermediate of the fluorinated ether compound suitably used for a surface treatment agent.

DESCRIPTION OF EMBODIMENTS

In this specification, a compound represented by the formula 1 will be referred to as compound 1. Compounds represented by other formulae will be referred to in the same manner.

Further, a group represented by the formula g1 will be referred to as group g1. Groups represented by other formulae will be referred to in the same manner.

In this specification, meanings of the following terms are as follows.

An "etheric oxygen atom" means an oxygen atom forming an ether bond (—O—) between carbon atoms. The chemical formula of the oxyperfluoroalkylene unit is represented so that its oxygen atom is described on the right-side of the perfluoroalkylene group.

A "hydrolyzable silyl group" means a group capable of forming a silanol group (Si—OH) by being hydrolyzed, and is $SiR^3{}_nL_{3-n}$ in the formula g4.

A "surface layer" means a layer formed on the surface of a substrate.

The "number average molecular weight" of the fluorinated ether compound is calculated by obtaining the number (average value) of oxyperfluoroalkylene units on the basis of terminal group, by $^1$H-NMR and $^{19}$F-NMR. The terminal group may, for example, be A or a hydrolyzable silyl group in the formula 1.

[Fluorinated Ether Compound]

The fluorinated ether compound of the present invention is compound 1.

$$A\text{-}O\text{—}(R^{f1}O)_m\text{-}Q^1(R^1)_b \qquad \text{formula 1}$$

wherein A is a $C_{1-20}$ perfluoroalkyl group, $R^{f1}$ is a perfluoroalkylene group, m is an integer of from 2 to 500, $(R^{f1}O)_m$ may consist of two or more types of $R^{f1}O$ differing in the number of carbon atoms, $Q^1$ is a (b+1) valent perfluorohydrocarbon group in which one or more of fluorine atoms may be substituted by a hydroxy group (provided that the fluorine atom bonded to the carbon atom bonded to $R^1$ is not substituted by a hydroxy group), $R^1$ is a monovalent organic group having at least one hydrolyzable silyl group (excluding one having an etheric oxygen atom), b is an integer of at least 2, and the b $R^1$ may be the same or different.

The number of carbon atoms in A is preferably from 1 to 10, more preferably from 1 to 6, particularly preferably from 1 to 3, in that the surface layer formed of the compound 1 will be more excellent in lubricity and abrasion resistance.

The number of carbon atoms in $R^{f1}$ is preferably from 1 to 6, in that the resulting surface layer will be more excellent in abrasion resistance and fingerprint stain removability.

$R^{f1}$ is preferably a linear perfluoroalkylene group, in that the resulting surface layer will be more excellent in abrasion resistance and lubricity.

m is preferably an integer of from 2 to 200, more preferably an integer of from 5 to 150, particularly preferably an integer of from 10 to 100. When m is at least the lower limit value of the above range, the surface layer will be more excellent in water/oil repellency. When m is at most the upper limit value of the above range, the surface layer will be more excellent in abrasion resistance. That is, if the number average molecular weight of the compound 1 is too high, the number of hydrolyzable silyl groups present per unit molecular weight decreases, and the abrasion resistance of the surface layer will be lowered.

In $(R^{f1}O)_m$, when at least two types of $R^{f1}O$ are present, the bonding order of the respective $R^{f1}O$ is not limited. For example, when $CF_2O$ and $CF_2CF_2O$ are present, such $CF_2O$ and $CF_2CF_2O$ may be arranged randomly, alternately or in block.

At least two types of $R^{f1}O$ being present is meant that at least two types of $R^{f1}O$ differing in the number of carbon atoms are present, and at least two types of $R^{f1}O$ differing in whether side chains are present or not or in the type of side chains (e.g. the number of side chains, the number of carbon atoms in the side chain) even having the same number of carbon atoms, are present.

With respect to arrangement of at least two types of $R^{f1}O$, for example, a structure represented by $\{(CF_2O)_{m1}(CF_2CF_2O)_{m2}\}$ indicates that m1 pieces of $(CF_2O)$ and m2 pieces of $(CF_2CF_2O)$ are randomly arranged. Further, a structure represented by $(CF_2CF_2O\text{—}CF_2CF_2CF_2CF_2O)_{m5}$ indicates that m5 pieces of $(CF_2CF_2O)$ and m5 pieces of $(CF_2CF_2CF_2CF_2O)$ are alternately arranged.

As $(R^{f1}O)_m$, preferred is $(R^{f1}O)_m$ having the following structure in at least a part thereof.

$\{(CF_2O)_{m1}(CF_2CF_2O)_{m2}\}$
$(CF_2CF_2O)_{m3}$
$(CF_2CF_2CF_2O)_{m4}$
$(CF_2CF_2O\text{—}CF_2CF_2CF_2CF_2O)_{m5}$
$(CF_2CF_2CF_2CF_2CF_2O)_{m6}(CF_2O)_{m7}$
$(CF_2CF_2CF_2CF_2CF_2O)_{m6}(CF_2CF_2O)_{m7}$
$(CF_2CF_2CF_2CF_2CF_2CF_2O)_{m6}(CF_2O)_{m7}$
$(CF_2CF_2CF_2CF_2CF_2CF_2O)_{m6}(CF_2CF_2O)_{m7}$
$(CF_2CF_2CF_2CF_2CF_2O\text{—}CF_2O)_{m8}$
$(CF_2CF_2CF_2CF_2CF_2O\text{—}CF_2CF_2O)_{m8}$
$(CF_2CF_2CF_2CF_2CF_2CF_2O\text{—}CF_2O)_{m8}$
$(CF_2CF_2CF_2CF_2CF_2CF_2O\text{—}CF_2CF_2O)_{m8}$
$(CF_2O\text{—}CF_2CF_2CF_2CF_2CF_2O)_{m8}$
$(CF_2O\text{—}CF_2CF_2CF_2CF_2CF_2CF_2O)_{m8}$
$(CF_2CF_2O\text{—}CF_2CF_2CF_2CF_2O)_{m8}$
$(CF_2CF_2O\text{—}CF_2CF_2CF_2CF_2CF_2CF_2O)_{m8}$ wherein m1 is an integer of at least 1, m2 is an integer of at least 1, m1+m2 is an integer of from 2 to 500, m3 and m4 are each an integer of from 2 to 500, m5 is an integer of from 1 to 250, m6 and m7 are each an integer of at least 1, m6+m7 is an integer of from 2 to 500, and m8 is an integer of from 1 to 250.

$(R^{f1}O)_m$ is preferably as follows, in view of easy production of the compound 1.

$\{(CF_2O)_{m1}(CF_2CF_2O)_{m2}\}$
$(CF_2CF_2CF_2O)_{m4}$
$(CF_2CF_2O)_2\{(CF_2O)_{m1}(CF_2CF_2O)_{m2-2}\}$
$(CF_2CF_2O\text{—}CF_2CF_2CF_2CF_2O)_{m5-1}CF_2CF_2O$
$(CF_2CF_2CF_2CF_2CF_2O\text{—}CF_2O)_{m8}$
$(CF_2CF_2CF_2CF_2CF_2CF_2O\text{—}CF_2O)_{m8}$
$(CF_2CF_2O\text{—}CF_2CF_2CF_2CF_2O)_{m8-1}CF_2CF_2O$
$(CF_2CF_2O\text{—}CF_2CF_2CF_2CF_2CF_2CF_2O)_{m8-1}CF_2CF_2O$
$\{(CF_2O)_{m1}(CF_2CF_2O)_{m2-3}\}$
$CF_2CF_2F_2OCF_2CF_2OCF_2CF_2O$
$(CF_2CF_2CF_2O)_{m4-3}CF_2CF_2OCF_2CF_2OCF_2CF_2O$
$(CF_2CF_2O)_2\{(CF_2O)_{m1}(CF_2CF_2O)_{m2-5}\}$
$CF_2CF_2OCF_2CF_2CF_2OCF_2CF_2O$ (CF$_2$CF$_2$O—CF$_2$CF$_2$CF$_2$CF$_2$O)$_{m5-1}$
CF$_2$CF$_2$CF$_2$OCF$_2$CF$_2$O
 (CF$_2$CF$_2$CF$_2$CF$_2$CF$_2$O—CF$_2$O)$_{m8-2}$
CF$_2$CF$_2$OCF$_2$CF$_2$CF$_2$OCF$_2$CF$_2$O
 (CF$_2$CF$_2$CF$_2$CF$_2$CF$_2$O—CF$_2$O)$_{m8-2}$
CF$_2$CF$_2$OCF$_2$CF$_2$CF$_2$OCF$_2$CF$_2$O
 (CF$_2$CF$_2$O—CF$_2$CF$_2$CF$_2$CF$_2$O)$_{m8-1}$
CF$_2$CF$_2$CF$_2$OCF$_2$CF$_2$O
 (CF$_2$CF$_2$O—CF$_2$CF$_2$CF$_2$CF$_2$CF$_2$O)$_{m8-1}$
CF$_2$CF$_2$CF$_2$OCF$_2$CF$_2$O
 {(CF$_2$O)$_{m1}$(CF$_2$CF$_2$O)$_{m2-3}$}
CF$_2$CF$_2$OCF$_2$CF$_2$CF$_2$CF$_2$OCF$_2$CF$_2$O
 (CF$_2$CF$_2$CF$_2$O)$_{m4-3}$
CF$_2$CF$_2$OCF$_2$CF$_2$CF$_2$CF$_2$OCF$_2$CF$_2$O
 (CF$_2$CF$_2$O)$_2${(CF$_2$O)$_{m1}$(CF$_2$CF$_2$O)$_{m2-5}$}
CF$_2$CF$_2$OCF$_2$CF$_2$CF$_2$CF$_2$OCF$_2$CF$_2$O
 (CF$_2$CF$_2$CF$_2$CF$_2$CF$_2$O—CF$_2$O)$_{m8-2}$
CF$_2$CF$_2$OCF$_2$CF$_2$CF$_2$CF$_2$OCF$_2$CF$_2$O
 (CF$_2$CF$_2$CF$_2$CF$_2$CF$_2$CF$_2$O—CF$_2$O)$_{m8-2}$
CF$_2$CF$_2$OCF$_2$CF$_2$CF$_2$CF$_2$OCF$_2$CF$_2$O
 (CF$_2$CF$_2$O—CF$_2$CF$_2$CF$_2$CF$_2$O)$_{m8-1}$
CF$_2$CF$_2$CF$_2$CF$_2$OCF$_2$CF$_2$O
 (CF$_2$CF$_2$O—CF$_2$CF$_2$CF$_2$CF$_2$CF$_2$O)$_{m8-1}$
CF$_2$CF$_2$CF$_2$CF$_2$OCF$_2$CF$_2$O
 {(CF$_2$O)$_{m1}$(CF$_2$CF$_2$O)$_{m2-2}$}CF$_2$CF$_2$OCF$_2$CF$_2$CF$_2$O
 (CF$_2$CF$_2$CF$_2$O)$_{m4-2}$CF$_2$CF$_2$OCF$_2$CF$_2$CF$_2$O
 (CF$_2$CF$_2$O)$_2${(CF$_2$O)$_{m1}$(CF$_2$CF$_2$O)$_{m2-4}$}
CF$_2$CF$_2$OCF$_2$CF$_2$CF$_2$O
 (CF$_2$CF$_2$O—CF$_2$CF$_2$CF$_2$CF$_2$O)$_{m5-1}$CF$_2$CF$_2$CF$_2$O
 (CF$_2$CF$_2$CF$_2$CF$_2$CF$_2$O—CF$_2$O)$_{m8-1}$
CF$_2$CF$_2$OCF$_2$CF$_2$CF$_2$O
 (CF$_2$CF$_2$CF$_2$CF$_2$CF$_2$O—CF$_2$O)$_{m8-1}$
CF$_2$CF$_2$OCF$_2$CF$_2$CF$_2$O
 (CF$_2$CF$_2$O—CF$_2$CF$_2$CF$_2$CF$_2$CF$_2$O)$_{m8-1}$CF$_2$CF$_2$CF$_2$O
 (CF$_2$CF$_2$O—CF$_2$CF$_2$CF$_2$CF$_2$CF$_2$O)$_{m8-1}$
CF$_2$CF$_2$CF$_2$O
 {(CF$_2$O)$_{m1}$(CF$_2$CF$_2$O)$_{m2-2}$}CF$_2$CF$_2$OCF$_2$CF$_2$CF$_2$CF$_2$O
 (CF$_2$CF$_2$CF$_2$O)$_{m4-2}$CF$_2$CF$_2$OCF$_2$CF$_2$CF$_2$CF$_2$O
 (CF$_2$CF$_2$O)$_2${(CF$_2$O)$_{m1}$(CF$_2$CF$_2$O)$_{m2-4}$}
CF$_2$CF$_2$OCF$_2$CF$_2$CF$_2$CF$_2$O
 (CF$_2$CF$_2$CF$_2$CF$_2$CF$_2$O—CF$_2$O)$_{m8-1}$
CF$_2$CF$_2$OCF$_2$CF$_2$CF$_2$CF$_2$O
 (CF$_2$CF$_2$CF$_2$CF$_2$CF$_2$CF$_2$O—CF$_2$O)$_{m8-1}$
CF$_2$CF$_2$OCF$_2$CF$_2$CF$_2$CF$_2$O
 (CF$_2$CF$_2$O—CF$_2$CF$_2$CF$_2$CF$_2$CF$_2$CF$_2$O)$_{m8-1}$
CF$_2$CF$_2$CF$_2$CF$_2$O
 (CF$_2$CF$_2$O—CF$_2$CF$_2$CF$_2$CF$_2$CF$_2$O)$_{m8-1}$
CF$_2$CF$_2$CF$_2$CF$_2$O
 {(CF$_2$O)$_{m1}$(CF$_2$CF$_2$O)$_{m2-1}$}CF$_2$CF$_2$CF$_2$CF$_2$O
 (CF$_2$CF$_2$CF$_2$O)$_{m4-1}$ CF$_2$CF$_2$CF$_2$CF$_2$CF$_2$O
 (CF$_2$CF$_2$O)$_2${(CF$_2$O)$_{m1}$(CF$_2$CF$_2$O)$_{m2-3}$}
CF$_2$CF$_2$CF$_2$CF$_2$O
 (CF$_2$CF$_2$CF$_2$CF$_2$CF$_2$O—CF$_2$O)$_{m8-1}$
CF$_2$CF$_2$CF$_2$CF$_2$CF$_2$CF$_2$O
 (CF$_2$CF$_2$CF$_2$CF$_2$CF$_2$O—CF$_2$O)$_{m8-1}$
CF$_2$CF$_2$CF$_2$CF$_2$CF$_2$CF$_2$CF$_2$O
 (CF$_2$CF$_2$O—CF$_2$CF$_2$CF$_2$CF$_2$CF$_2$O)$_{m8-1}$
CF$_2$CF$_2$CF$_2$CF$_2$CF$_2$CF$_2$O
 (CF$_2$CF$_2$O—CF$_2$CF$_2$CF$_2$CF$_2$CF$_2$CF$_2$O)$_{m8-1}$
CF$_2$CF$_2$CF$_2$CF$_2$CF$_2$CF$_2$CF$_2$CF$_2$O
wherein m2, m4, m5 and m8 are selected so that m2-1, m2-2, m2-3, m2-4, m2-5, m4-2, m4-3, m5-1, m8-1 and m8-2 are an integer of at least 1.

Q$^1$ is preferably a saturated perfluorohydrocarbon group.
The number of carbon atoms in Q$^1$ is preferably from 2 to 10, particularly preferably from 2 to 6, in that the compound 1 is easily produced and the resulting surface layer will be more excellent in abrasion resistance, light resistance and chemical resistance. Q$^1$ may have branches or may have a cyclic structure. Q$^1$ may have a quaternary carbon atom bonded to four carbon atoms.

b is preferably from 2 to 6, more preferably from 2 to 4, particularly preferably 2 or 3, in that the compound 1 is easily produced and the resulting surface layer will be more excellent in abrasion resistance, light resistance and chemical resistance. When b is at least the lower limit value of the above range, the compound 1 will be firmly bonded to the surface of the substrate, whereby the surface layer will be more excellent in abrasion resistance, light resistance and chemical resistance. When b is at most the upper limit value of the above range, the raw material will be easily available, and the compound 1 is easily produced. Further, the terminal on the hydrolyzable silyl group side of the compound 1 will not be bulky, and the density of the compound 1 on the surface of the substrate is relatively high and as a result, the surface layer will be more excellent in abrasion resistance, light resistance and chemical resistance.

In the compound 1, in that the compound 1 is easily produced and the resulting surface layer will be more excellent in abrasion resistance, light resistance and chemical resistance, it is particularly preferred that b is 2 and Q$^1$ is the group g1, g2 or g3:

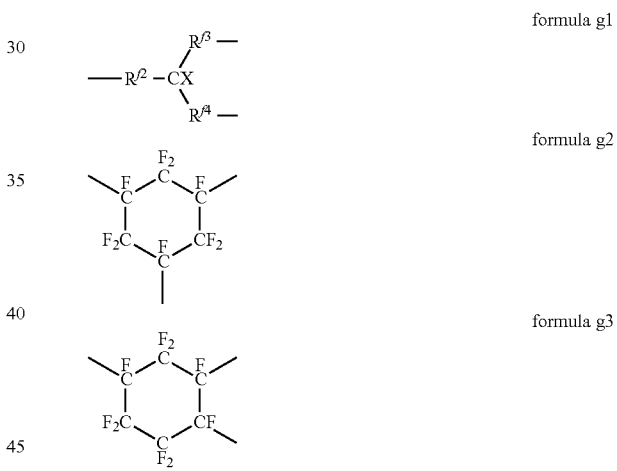

In the formulae, X is a fluorine atom, a perfluoroalkyl group or a hydroxy group, R$^{f2}$ is a single bond or a perfluoroalkylene group bonded to the terminal oxygen atom of (R$^{f1}$O)$_m$, R$^{f3}$ and R$^{f4}$ are a single bond or a perfluoroalkylene group bonded to R$^1$, at least one of R$^{f2}$, R$^{f3}$ and R$^{f4}$ is a perfluoroalkylene group, and when X is a hydroxy group, R$^{f3}$ and R$^{f4}$ are a perfluoroalkylene group bonded to R$^1$.

The number of carbon atoms in the perfluoroalkyl group as X is preferably from 1 to 5. The number of carbon atoms in the perfluoroalkylene group as R$^{f2}$, R$^{f3}$ and R$^{f4}$ is preferably from 1 to 5.

X is particularly preferably a fluorine atom, —CF$_3$ or —CF$_2$CF$_3$ in that the compound 1 is easily produced and the resulting surface layer will be more excellent in abrasion resistance, light resistance and chemical resistance.

R$^{f2}$ is preferably a single bond, —CF$_2$— or —CF$_2$CF$_2$— in that the compound 1 is easily produced and the resulting surface layer will be more excellent in abrasion resistance, light resistance and chemical resistance.

$R^{f3}$ and $R^{f4}$ are particularly preferably a single bond, —$CF_2$— or —$CF_2CF_2$—, in that the compound 1 is easily produced and the resulting surface layer will be more excellent in abrasion resistance, light resistance and chemical resistance.

The group g1 is preferably a group represented by the following formula, in that the compound 1 is easily produced and the resulting surface layer will be more excellent in abrasion resistance, light resistance and chemical resistance. The connecting bond on the left side of each group is bonded to the terminal oxygen atom of $(R^{f1}O)_m$.

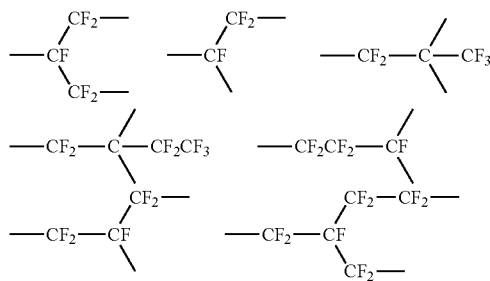

$R^1$ is preferably group g4, whereby the effects of the present invention are likely to be obtained.

formula g4 wherein Z is a single bond or —$C(O)N(R^2)$—, $R^2$ is a hydrogen atom or an alkyl group, $Q^2$ is a (p+1) valent organic group (provided that it is an organic group having no hydrolyzable silyl group nor etheric oxygen atom), $R^3$ is a monovalent hydrocarbon group, L is a hydrolyzable group, n is an integer of from 0 to 2, p is an integer of at least 1, and when p is at least 2, the p [—$SiR^3{}_nL_{3-n}$] may be the same or different.

Z is preferably a single bond in that the resulting surface layer will be more excellent in abrasion resistance, light resistance and chemical resistance.

$R^2$ is preferably a hydrogen atom in that the compound 1 is easily produced. The number of carbon atoms in the alkyl group as $R^2$ is preferably from 1 to 3, particularly preferably 1.

p is preferably from 1 to 3, more preferably 1 or 2, particularly preferably 1, in that the compound 1 is easily produced and the resulting surface layer will be more excellent in abrasion resistance, light resistance and chemical resistance.

$Q^2$ is preferably a bivalent to tetravalent organic group in that the compound 1 is easily produced and the resulting surface layer will be more excellent in abrasion resistance, light resistance and chemical resistance. The organic group in $Q^2$ is preferably a hydrocarbon group in that the resulting surface layer will be more excellent in light resistance and chemical resistance, particularly preferably a saturated hydrocarbon group or an aromatic hydrocarbon group, or a group comprising a combination thereof. The number of carbon atoms in $Q^2$ is preferably from 2 to 10, more preferably from 2 to 6, particularly preferably from 2 or 3.

$Q^2$ is preferably a $C_{2-6}$ alkylene group, particularly preferably a $C_{2-3}$ alkylene group.

$SiR^3{}_nL_{3-n}$ is a hydrolyzable silyl group.

The compound 1 has at least two hydrolyzable silyl groups at its terminal. The compound 1 having at least two hydrolyzable silyl groups at its terminal is firmly chemically bonded to a substrate, and is thereby capable of forming a surface layer excellent in abrasion resistance.

Further, the compound 1 has hydrolyzable silyl groups only at one terminal. The compound 1 having hydrolyzable silyl groups only at one terminal is less likely to aggregate, and is thereby capable of forming a surface layer excellent in outer appearance.

L is a hydrolyzable group. The hydrolyzable group is a group which becomes a hydroxy group by hydrolysis reaction. That is, Si-L at the terminal of the compound 1 becomes a silanol group (Si—OH) by hydrolysis reaction. Silanol groups will further be intermolecularly reacted to form Si—O—Si bonds. Further, a silanol group will undergo dehydration condensation reaction with a hydroxy group (substrate-OH) on the surface of a substrate, to form a chemical bond (substrate-O—Si).

L may, for example, be an alkoxy group, a halogen atom, an acyl group, an acyloxy group or an isocyanate group. The alkoxy group is preferably a $C_{1-4}$ alkoxy group. The halogen atom is particularly preferably a chlorine atom.

L is, in view of easy production of the compound 1, preferably an alkoxy group or a halogen atom. L is, since outgassing during application will be less, and storage stability of the compound 1 will be excellent, preferably a $C_{1-4}$ alkoxy group, and in a case where long term storage stability of the compound 1 is required, particularly preferably an ethoxy group, and in a case where the reaction time after coating should be short, particularly preferably a methoxy group.

$R^3$ is a monovalent hydrocarbon group. The monovalent hydrocarbon group may, for example, be an alkyl group, a cycloalkyl group, an alkenyl group or an allyl group.

$R^3$ is particularly preferably a monovalent saturated hydrocarbon group. The number of carbon atoms in the monovalent saturated hydrocarbon group is preferably from 1 to 6, more preferably from 1 to 3, particularly preferably from 1 to 2. When the number of carbon atoms in $R^3$ is within such a range, the compound 1 is easily produced.

n is preferably 0 or 1, particularly preferably 0. By the presence of a plurality of L in one hydrolyzable silyl group, bonding to the substrate will be more firm.

$SiR^3{}_nL_{3-n}$ is preferably $Si(OCH_3)_3$, $SiCH_3(OCH_3)_2$, $Si(OCH_2CH_3)_3$, $SiCl_3$, $Si(OCOCH_3)_3$ or $Si(NCO)_3$. In view of handling efficiency in industrial production, $Si(OCH_3)_3$ is particularly preferred.

The two or more $SiR^3{}_nL_{3-n}$ in the compound 1 may be the same or different. From the production efficiency of the compound 1, they are preferably the same group.

As the compound 1, for example, compounds 1-1 to 1-15 may be mentioned. The following compounds are preferred from such a viewpoint that they are industrially easy to manufacture and easy to handle, and they provide a surface layer further excellent in water/oil repellency, abrasion resistance, fingerprint stain removability, lubricity, chemical resistance, light resistance and chemical resistance.

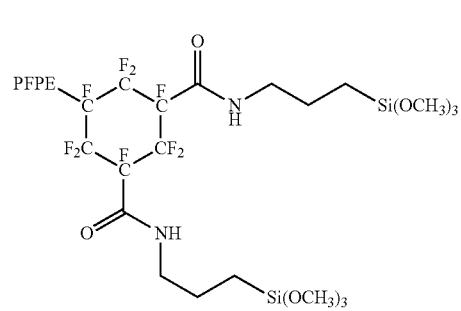

formula 1-2
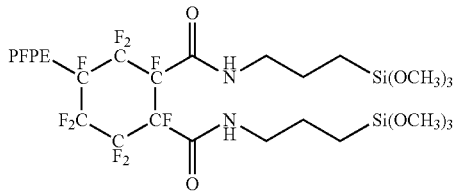

formula 1-3
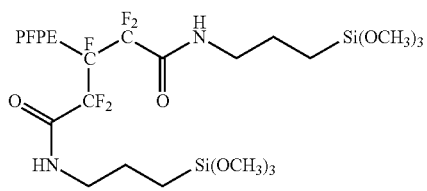

formula 1-4
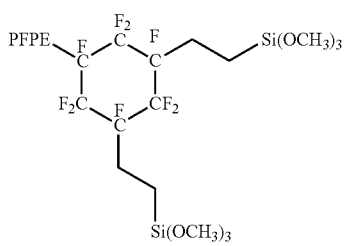

formula 1-5
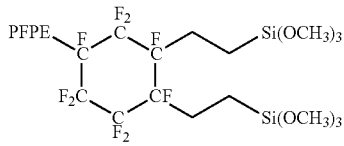

formula 1-6
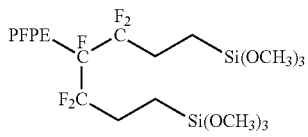

formula 1-7
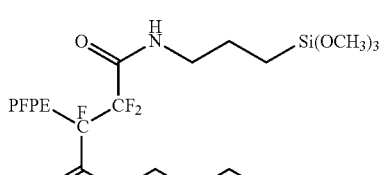

formula 1-8
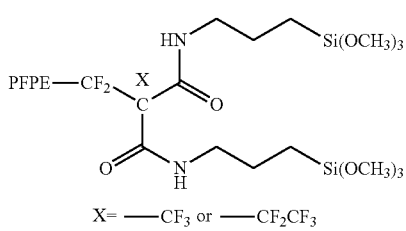

X= —CF$_3$ or —CF$_2$CF$_3$ formula 1-9
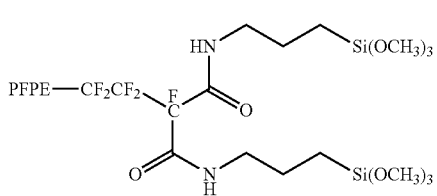

formula 1-10
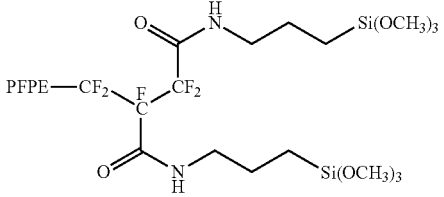

formula 1-11
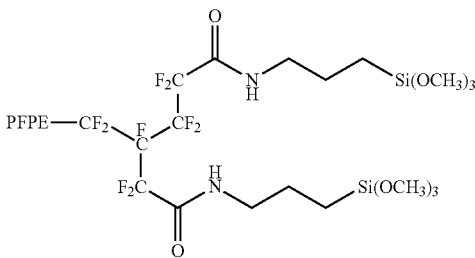

formula 1-12
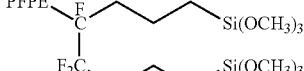

formula 1-13
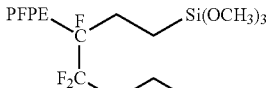

formula 1-14
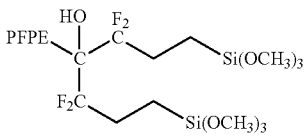

formula 1-15
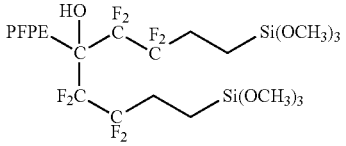

In the formulae, PFPE is a perfluoropolyether chain, that is, A-O—(R$^{f1}$O)$_m$—. A preferred embodiment of PFPE is a combination of the above preferred A and (R$^{f1}$O)$_m$.

(Method for Producing Compound 1)

The compound 1 may be produced by a method of subjecting compound 2 and HSiR$^3{}_n$L$_{3-n}$ to hydrosilylation.

$$A\text{-}O\text{—}(R^{f1}O)_m\text{-}Q^1(R^{1a})_b \qquad \text{formula 2}$$

wherein R$^{1a}$ is a monovalent organic group having at least one ω-alkenyl group (provided that it is an organic group having no hydrolyzable silyl group nor etheric oxygen atom), the b R$^{1a}$ may be the same or different, R$^{1a}$ becomes R$^1$ in the compound 1 after hydrosilylation. The ω-alkenyl group is preferably a C$_{2-4}$ ω-alkenyl group, and may, for example, be specifically an allyl group, a vinyl group or a 3-butenyl group.

A, (R$^{f1}$O)$_m$, Q$^1$ and b are the same as A, (R$^{f1}$O)$_m$, Q$^1$ and b as described for the compound 1, and the preferred embodiments are also the same.

The monovalent organic group having at least one ω-alkenyl group in R$^{1a}$ is preferably group g5 in that a preferred compound 1 is obtained.

$$\text{—Z-}Q^{2a}[\text{-CH}\!\!=\!\!\text{CH}_2]_p \qquad \text{formula g5}$$

wherein $Q^{2a}$ is a single bond (only when p is 1) or a (p+1) valent organic group (provided that it is an organic group having no hydrolyzable silyl group, no ω-alkenyl group nor etheric oxygen atom). The organic group as $Q^{2a}$ is preferably a hydrocarbon group in that the resulting surface layer will be more excellent in light resistance and chemical resistance, particularly preferably a saturated hydrocarbon group or an aromatic hydrocarbon group, or a group comprising a combination thereof. The number of carbon atoms in $Q^{2a}$ is preferably from 1 to 8, more preferably from 1 to 4, particularly preferably 1 or 2. The group g5 becomes —Z-$Q^2$ in the group g4 after hydrosilylation.

Z and p are the same as Z and p as described for the group g4, and the preferred embodiments are also the same.

(Method for Producing Compound 2)

The compound 2 may be produced, for example, by using compound 31 as a starting material, introducing a group corresponding to $(R^{f1}O)_s$-$Q^1$ to the terminal on the hydroxy group side of the compound 31, then conducting a fluorination treatment to obtain an intermediate having $(R^{f1}O)_s$-$Q^1$, and further introducing a group having a carbon-carbon unsaturated double bond to the terminal on the perfluorohydrocarbon group side of the intermediate.

A-O—$(R^{f1}O)_t$—$R^{f1}CH_2$—OH   formula 31 wherein $R^{f11}$ is a perfluoroalkylene group, t is an integer to make t+1+s be m, and s is an integer of at least 0. A, $R^{f1}O$ and m are the same as A, $R^{f1}O$ and m as described for the compound 1, and the preferred embodiments are also the same. s is preferably from 0 to 6, more preferably from 0 to 3.

Further, the compound 2 may be produced in the same manner as above by introducing a group corresponding to $(R^{f1}O)_s$-$Q^1$ to the iodine atom side terminal of compound 32, and conducting a fluorination treatment or the like to obtain an intermediate having $(R^{f1}O)_s$-$Q^1$.

A-O—$(R^{f1}O)_t$—$R^{f11}$—I   formula 32

Further, in the above production method comprising a fluorination treatment step of converting the hydrogen atom bonded to a carbon atom into a fluorine atom, it is possible to use, as a starting material, a compound having a fluoroalkyl group or an alkyl group having a hydrogen atom bonded to a carbon atom, which becomes A by the fluorination treatment, a compound having an oxyalkylene unit or oxyalkylene unit having a hydrogen atom bonded to a carbon atom, which becomes $(R^{f1}O)$ by the fluorination treatment, on the A side, or the like. For example, compound 33 or compound 34 corresponding to the compound 31 or 32 may be used as a starting material.

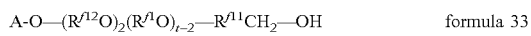

A-O—$(R^{f12}O)_2(R^{f1}O)_{t-2}$—$R^{f11}CH_2$—OH   formula 33

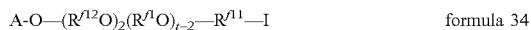

A-O—$(R^{f12}O)_2(R^{f1}O)_{t-2}$—$R^{f11}$—I   formula 34 wherein $R^{f12}$ is a fluoroalkylene group having a hydrogen atom, and the two $(R^{f12}O)$ may be different oxyfluoroalkylene units.

The compound 31 and the like may be produced by the method disclosed in WO2009/008380, WO2013/121984, WO2013/121986, WO2014/163004, WO2015/087902, WO2017/038830, WO2017/038832 or the like.

The compound 2 is produced, specifically, as follows.

For example, by introduction of a group corresponding to $Q^1$ to the terminal on the hydroxy group side of the compound 31 and a fluorination treatment or the like, an intermediate having a perfluorohydrocarbon group and —C(O)OCF$_3$ bonded to the perfluorohydrocarbon group is obtained, —C(O)OCF$_3$ of the intermediate and an allylamine are reacted to produce compound 2 having —C(O)NHCH$_2$CH═CH$_2$ at its terminal.

Otherwise, by introduction of a group corresponding to $Q^1$ to the terminal on the hydroxy group side of the compound 31, a fluorination treatment or the like, an intermediate having a perfluorohydrocarbon group and —C(O)OCF$_3$ bonded to the perfluorohydrocarbon group is obtained, which is reacted with iodine to replace —C(O)OCF$_3$ with —I, ethylene is added to the —I moiety of the intermediate to form —CH$_2$CH$_2$I, and HI is removed under heating conditions to produce compound 2 having —CH═CH$_2$ at its terminal.

The above-described compound 1 is capable of forming a surface layer excellent in initial water/oil repellency, fingerprint stain removability, abrasion resistance, light resistance and chemical resistance, from the following reasons.

The compound 1, in which A has CF$_3$— at its terminal, has CF$_3$— at one terminal thereof, and has hydrolyzable silyl groups at the other terminal. According to the compound 1 having CF$_3$— at one terminal and hydrolyzable silyl groups at the other terminal, a surface layer having a low surface energy can be formed, which is excellent in lubricity and abrasion resistance. Whereas a surface layer formed of a fluorinated ether compound having a hydrolyzable silyl group at both terminals is insufficient in lubricity and abrasion resistance.

The compound 1 has $(R^{f1}O)_m$ and thereby has a high fluorine atom content. Accordingly, the compound 1 is capable of forming a surface layer excellent in initial water/oil repellency, abrasion resistance and fingerprint stain removability.

Since the compound 1 has a perfluorohydrocarbon group between a perfluoropolyether chain and a hydrolyzable silyl group and has no etheric oxygen atom between the perfluorohydrocarbon group and the hydrolyzable silyl group, the bond between the perfluoropolyether chain and the hydrolysable silyl group is hardly cleaved e.g. by friction, light or chemicals. Accordingly, the compound 1 is capable of forming a surface layer excellent in abrasion resistance, light resistance and chemical resistance.

[Fluorinated Ether Composition]

The fluorinated ether composition of the present invention (hereinafter sometimes referred to as "the present composition") comprises at least one type of the compound 1 and other fluorinated ether compound.

As other fluorinated ether compound, a fluorinated ether compound formed as a by-product during production of the compound 1 (hereinafter sometimes referred to as "by-product fluorinated ether compound") and a known fluorinated ether compound used in the same applications as the compound 1 may, for example, be mentioned.

Other fluorinated ether compound is preferably one unlikely to impair the properties of the compound 1.

As the by-product fluorinated ether compound, unreacted compounds 2, 31 and the like, and fluorinated ether compounds formed through isomerization of some of the allyl groups into an inner olefin accompanying hydrosilylation during the production of the compound 1 may, for example, be mentioned.

As the known fluorinated ether compound, a commercially available fluorinated ether compound may, for example, be mentioned. In a case where the present composition contains a known fluorinated ether compound, it may have new effects such as compensation for the properties of the compound 1.

The content of the compound 1 is preferably at least 60 mass % and less than 100 mass %, more preferably at least 70 mass % and less than 100 mass %, particularly preferably at least 80 mass % and less than 100 mass % in the present composition.

The content of other fluorinated ether compound is preferably more than 0 mass % and at most 40 mass %, more preferably more than 0 mass % and at most 30 mass %, particularly preferably more than 0 mass % and at most 20 mass % in the present composition.

The total content of the compound 1 and other fluorinated ether compound is preferably from 80 to 100 mass %, particularly preferably from 85 to 100 mass % in the present composition.

When the content of the compound 1 and the content of other fluorinated ether compound are within the above ranges, the resulting surface layer will be more excellent in initial water/oil repellency, abrasion resistance, fingerprint stain removability, light resistance and chemical resistance.

The present composition may contain a component other than the compound 1 and other fluorinated ether compound.

Other component may, for example, be a by-product formed during production of the compound 1 or the known fluorinated ether compound (excluding the by-product fluorinated ether compound) or a compound inevitable in production such as an unreacted raw material.

Further, additives such as an acid catalyst or a basic catalyst to promote hydrolysis and condensation reaction of the hydrolyzable silyl group may be mentioned. The acid catalyst may, for example, be hydrochloric acid, nitric acid, acetic acid, sulfuric acid, phosphoric acid, sulfonic acid, methanesulfonic acid or p-toluenesulfonic acid. The basic catalyst may, for example, be sodium hydroxide, potassium hydroxide or ammonia.

The content of other component is preferably from 0 to 10 mass %, particularly preferably from 0 to 1 mass % in the present composition.

[Coating Liquid]

The coating liquid of the present invention (hereinafter sometimes referred to as "the present coating liquid") comprises the compound 1 or the present composition, and a liquid medium. The present coating liquid may be a solution or a dispersion.

The liquid medium is preferably an organic solvent. The organic solvent may be a fluorinated organic solvent, may be a non-fluorinated organic solvent, or may contain both solvents.

The fluorinated organic solvent may, for example, be a fluorinated alkane, a fluorinated aromatic compound, a fluoroalkyl ether, a fluorinated alkylamine, a fluoroalcohol, etc.

The fluorinated alkane is preferably a $C_{4-8}$ compound. Commercially available products may, for example, be $C_6F_{13}H$ (manufactured by Asahi Glass Company, Limited, ASAHIKLIN (registered trademark) AC-2000), $C_6F_{13}O_2H_5$ (manufactured by Asahi Glass Company, Limited, ASAHIKLIN (registered trademark) AC-6000), and $C_2F_5CHFCHFCF_3$ (manufactured by Chemours, Vertrel (registered trademark) XF).

The fluorinated aromatic compound may, for example, be hexafluorobenzene, trifluoromethylbenzene, perfluorotoluene or bis(trifluoromethyl)benzene.

The fluoroalkyl ether is preferably a $C_{4-12}$ compound. Commercially available products may, for example, be $CF_3CH_2OCF_2CF_2H$ (manufactured by Asahi Glass Company, Limited, ASAHIKLIN (registered trademark) AE-3000), $C_4F_9OCH_3$ (manufactured by 3M, Novec (registered trademark) 7100), $C_4F_9OC_2H_5$ (manufactured by 3M, Novec (registered trademark) 7200), and $C_2F_5CF(OCH_3)C_3F_7$ (manufactured by 3M, Novec (registered trademark) 7300).

The fluorinated alkylamine may, for example, be perfluorotripropylamine or perfluorotributylamine.

The fluoroalcohol may, for example, be 2,2,3,3-tetrafluoropropanol, 2,2,2-trifluoroethanol or hexafluoroisopropanol.

The non-fluorinated organic solvent is preferably a compound consisting solely of hydrogen atoms and carbon atoms, or a compound consisting solely of hydrogen atoms, carbon atoms and oxygen atoms, and may be a hydrocarbon, an alcohol, a ketone, an ether, or an ester.

The liquid medium may be a mixed medium having two or more types mixed.

The content of the compound 1 or the present composition is preferably from 0.001 to 10 mass %, particularly preferably from 0.01 to 1 mass % in the present coating liquid.

The content of the liquid medium is preferably from 90 to 99.999 mass %, particularly preferably from 99 to 99.99 mass % in the present coating liquid.

[Article]

The article of the present invention (hereinafter sometimes referred to as "the present article") has a surface layer formed of the compound 1 or the present composition on the surface of a substrate.

The surface layer contains the compound 1 in a state where some or all of hydrolyzable silyl groups in the compound 1 are hydrolyzed and subjected to dehydration condensation reaction.

The thickness of the surface layer is preferably from 1 to 100 nm, particularly preferably from 1 to 50 nm. When the thickness of the surface layer is at least the lower limit value of the above range, the effect by the surface treatment is likely to be sufficiently obtained. When the thickness of the surface layer is at most the upper limit value of the above range, utilization efficiency will be high. The thickness of the surface layer can be calculated from an oscillation period of an interference pattern of reflected X-ray, obtained by X-ray reflectance method using an X-ray diffractometer for thin film analysis (manufactured by Rigaku Corporation, ATX-G).

The substrate may be a substrate which is desired to have water/oil repellency imparted. The material of the substrate may, for example, be a metal, a resin, glass, sapphire, ceramic, stone or a composite material thereof. The glass may be chemically tempered. The substrate may have a primer film such as a $SiO_2$ film formed on its surface.

As the substrate, a substrate for a touch panel, a substrate for display or a spectacle lens is preferred, and a substrate for a touch panel is particularly preferred. As the material of a substrate for a touch panel, glass or a transparent resin is preferred.

[Method for Producing Article]

The present article may be produced, for example, by the following method.

A method of treating the surface of a substrate by dry coating method using the compound 1 or the present composition, to form a surface layer formed of the compound 1 or the present composition on the surface of the substrate.

A method of applying the coating liquid to the surface of a substrate by wet coating method, followed by drying to form a surface layer formed of the compound 1 or the present composition on the surface of the substrate.

As the dry coating method, a method such as vacuum deposition, CVD or sputtering may be mentioned. With a view to suppressing decomposition of the compound 1 and from the viewpoint of simplicity of apparatus, vacuum deposition method is preferred. At the time of vacuum deposition, a pelletized material having a metal porous product of iron, steel or the like impregnated with the compound 1 or the present composition may be used. A pelletized material impregnated with the compound 1 or the present composition, obtained by impregnating a metal porous product of iron, steel or the like with the present coating liquid and drying the liquid medium, may be used.

The wet coating method may, for example, be a spin coating method, a wipe coating method, a spray coating method, a squeegee coating method, a dip coating method, a die coating method, an ink-jet method, a flow coating method, a roll coating method, a casting method, a Langmuir-Blodgett method, or a gravure coating method.

EXAMPLES

Now, the present invention will be described in further detail with reference to Examples, but the present invention is not limited to these Examples. Hereinafter, "%" is "mass %" unless otherwise specified. Ex. 1 to 13 and 21 to 33 are Examples of the present invention, and Ex. 14, 15, 34 and 35 are Comparative Examples.

Ex. 1

Ex. 1-1

Compound 3-1 was obtained in accordance with the method disclosed in Ex. 11-1 to 11-5 in WO2013/121984.

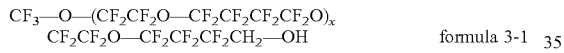

formula 3-1

Mean value of unit number x: 13, number average molecular weight of compound 3-1: 5,050.

Ex. 1-2

Into a 500 mL eggplant flask, 10 g of the compound 3-1 obtained in Ex. 1-1, 40 g of AE-3000 and 0.4 g of 2,6-dimethylpyridine were put, followed by cooling in an ice bath. 3.2 g of trifluoromethylsulfonic anhydride was put, followed by stirring at 25° C. for 12 hours. Water was added, liquid separation was conducted with ethyl acetate, and the obtained organic phase was dehydrated over magnesium sulfate. Magnesium sulfate was removed by filtration, and 10.4 g (yield: 100%) of compound 4-1 was obtained.

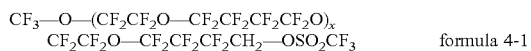

formula 4-1

NMR spectrum of compound 4-1:
$^1$H-NMR (300.4 MHz, solvent: CDCl$_3$, reference: tetramethylsilane (TMS)) δ (ppm): 4.5 (2H).
$^{19}$F-NMR (282.7 MHz, solvent: CDCl$_3$, reference: CFCl$_3$) δ (ppm): −55 (3F), −83 (50F), −88 (50F), −91 (2F), −120 (2F), −126 (48F), −127 (2F).
Mean value of unit number x: 13.

Ex. 1-3

Into a 200 mL eggplant flask, 20 g of the compound 4-1 obtained in Ex. 1-2, 4.2 g (20 mmol) of 5-hydroxydimethyl phthalate, 2.8 g (20.0 mmol) of cesium carbonate, 40 mL of N,N-dimethylformamide and 40 mL of 1,3-bistrifluoromethylbenzene (manufactured by Asahi Glass Company, Limited, SR-solvent) were put, followed by stirring at 100° C. for 35 hours. The temperature was returned to 25° C., 20 mL of methanol and 20 mL of AC-6000 were put for liquid separation, and the resulting organic phase was concentrated. The obtained reaction crude liquid was purified by column chromatography to obtain 5.9 g (yield: 29%) of compound 5-1.

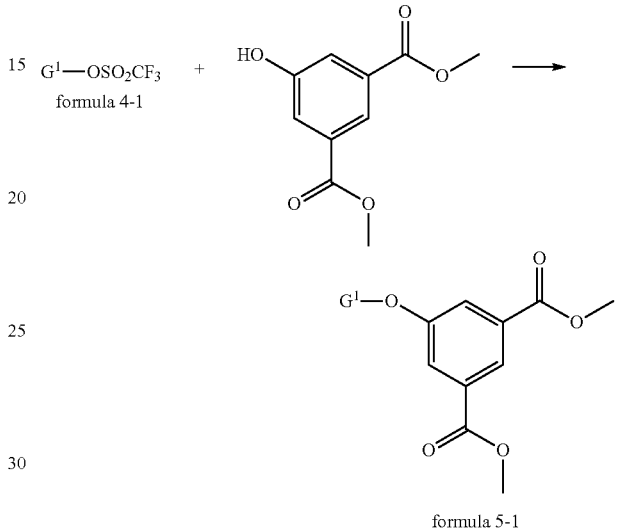

formula 5-1

$G^1 = CF_3-O-(CF_2CF_2O-CF_2CF_2CF_2CF_2O)_xCF_2CF_2O-CF_2CF_2CF_2CH_2-$

NMR spectrum of compound 5-1:
$^1$H-NMR (300.4 MHz, solvent: CDCl$_3$, reference: TMS) δ (ppm): 8.1 (1H), 7.8 (2H), 4.5 (2H), 3.9 (6H).
$^{19}$F-NMR (282.7 MHz, solvent: CDCl$_3$, reference: CFCl$_3$) δ (ppm): −55 (3F), −83 (50F), −88 (50F), −91 (2F), −120 (2F), −126 (48F), −127 (2F).
Mean value of unit number x: 13.

Ex. 1-4

Into a 500 mL nickel reactor, 250 mL of ClCF$_2$CFClCF$_2$OCF$_2$CF$_2$Cl (hereinafter referred to as "CFE-419") was put, and a nitrogen gas was blown in. After the oxygen gas concentration was sufficiently lowered, a 20 vol % fluorine gas diluted with a nitrogen gas was blown in for 1 hour. A CFE-419 solution (concentration: 10%, compound 5-1: 6.0 g) of the compound 5-1 obtained in Ex. 1-3 was charged over a period of 2 hours. The ratio of the fluorine gas introduction rate (mol/hr) to the introduction rate (mol/hr) of hydrogen atoms in the compound 5-1 was adjusted to be 2:1. After charging of the compound 5-1, a CFE-419 solution (concentration: 0.1%, benzene: 0.1 g) of benzene was intermittently charged. After charging of benzene, a fluorine gas was blown in for one hour, and finally the system in the reactor was sufficiently replaced with a nitrogen gas. The solvent was distilled off to obtain 6.1 g (yield: 90%) of compound 6-1.

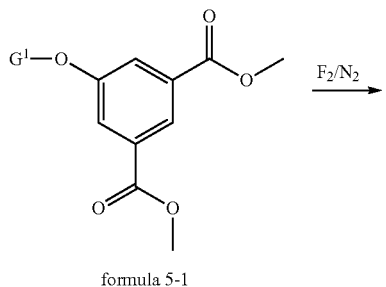

formula 5-1

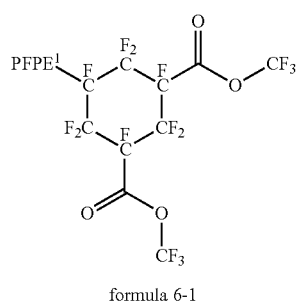

formula 6-1

G¹ =
CF₃—O—(CF₂CF₂O—CF₂CF₂CF₂CF₂O)ₓCF₂CF₂O—CF₂CF₂CF₂CH₂—

PFPE¹ =
CF₃—O—(CF₂CF₂O—CF₂CF₂CF₂CF₂O)ₓCF₂CF₂O—CF₂CF₂CF₂CF₂O—

NMR spectrum of compound 6-1:
¹⁹F-NMR (282.7 MHz, solvent: CDCl₃, reference: CFCl₃) δ (ppm): −55 (3F), −57 (6F), −83 (50F), −88 (52F), −91 (2F), −120 to 130 (61F).

Mean value of unit number x: 13.

Ex. 1-5

Into a 50 mL eggplant flask, 1.5 g of the compound 6-1 obtained in Ex. 1-4, 0.1 g of sodium fluoride and 1 mL of AC-2000 were put, followed by stirring under cooling in an ice bath. 0.2 g of allylamine was put, followed by stirring at 25° C. for one hour. AC-6000 was put, the reaction mixture was subjected to filtration, and the filtrate was purified by column chromatography to obtain 1.2 g (yield: 80%) of compound 2-1.

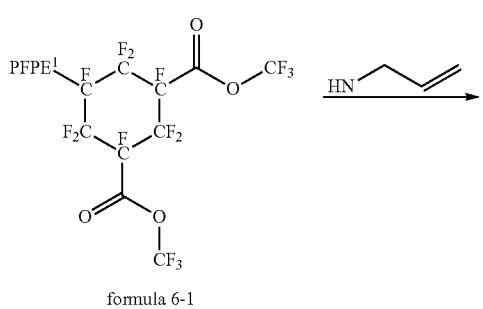

formula 6-1

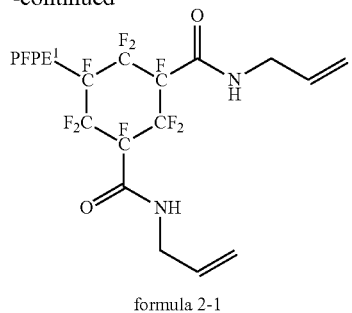

formula 2-1

PFPE¹ =
CF₃—O—(CF₂CF₂O—CF₂CF₂CF₂CF₂O)ₓCF₂CF₂O—CF₂CF₂CF₂CF₂O—

NMR spectrum of compound 2-1:
¹H-NMR (300.4 MHz, solvent: CDCl₃, reference: TMS) δ (ppm): 5.8 (2H), 5.2 (4H), 4.0 (4H).
¹⁹F-NMR (282.7 MHz, solvent: CDCl₃, reference: CFCl₃) δ (ppm): −55 (3F), −83 (50F), −88 (52F), −91 (2F), −120 to 130 (61F).

Mean value of unit number x: 13.

Ex. 1-6

Into a 20 mL eggplant flask, 1.0 g of the compound 2-1 obtained in Ex. 1-5, 0.073 g of trimethoxysilane, 0.0001 g of aniline, 1.0 g of AC-6000 and 0.0033 g of a platinum/1,3-divinyl-1,1,3,3-tetramethyldisiloxane complex were put, followed by stirring at 25° C. overnight. The reaction mixture was concentrated to obtain 1.0 g (yield: 100%) of compound 1-1.

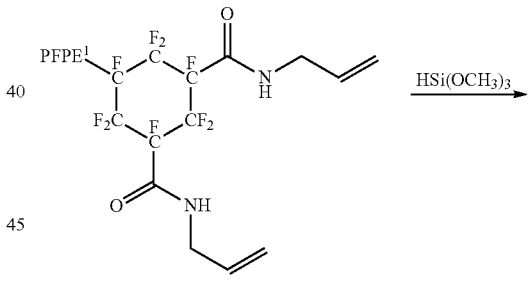

formula 2-1

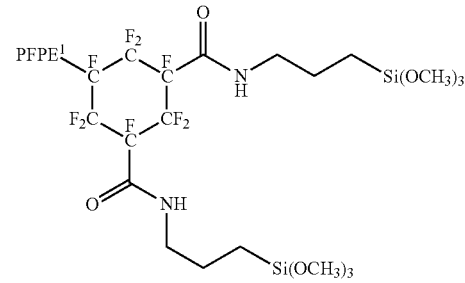

formula 1-1

PFPE¹ =
CF₃—O—(CF₂CF₂O—CF₂CF₂CF₂CF₂O)ₓCF₂CF₂O—CF₂CF₂CF₂CF₂O—

NMR spectrum of compound 1-1:
¹H-NMR (300.4 MHz, solvent: CDCl₃, reference: TMS) δ (ppm): 3.6 (18H), 3.4 (4H), 1.7 (4H), 0.7 (4H).

$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13, number average molecular weight of compound 1-1: 5,400.

Ex. 2

Ex. 2-1

Into a 500 mL eggplant flask, 10 g of the compound 3-1 obtained in Ex. 1-1, 1.2 g of compound 20-1, 60 g of AE-3000 and 2.8 g of cesium carbonate were put, followed by stirring at 50° C. for 18 hours. The reaction mixture was cooled to 25° C., and cesium carbonate was removed by filtration. AE-3000 was distilled off under reduced pressure, and the residue was purified by silica gel column chromatography to obtain 10.5 g (yield: 100%) of compound 5-2.

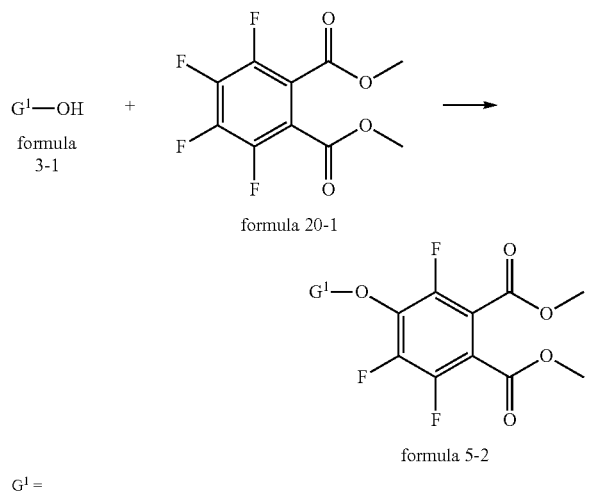

G$^1$ =
CF$_3$—O—(CF$_2$CF$_2$O—CF$_2$CF$_2$CF$_2$O)$_x$CF$_2$CF$_2$O—CF$_2$CF$_2$CF$_2$CH$_2$—

NMR spectrum of compound 5-2:
$^1$H-NMR (300.4 MHz, solvent: CDCl$_3$, reference: TMS) δ (ppm): 4.6 (2H), 3.9 (6H).
$^{19}$F-NMR (282.7 MHz, solvent: CDCl$_3$, reference: CFCl$_3$) δ (ppm): −55 (3F), −83 (50F), −88 (50F), −91 (2F), −120 to 140 (55F).

Mean value of unit number x: 13.

Ex. 2-2

6.1 g of compound 6-2 was obtained in the same manner as in Ex. 1-4 except that the compound 5-2 obtained in Ex. 2-1 was used instead of the compound 5-1.

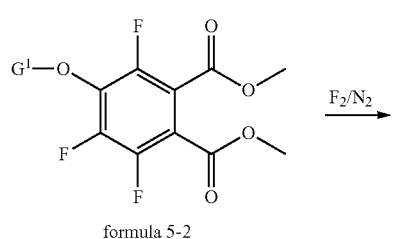

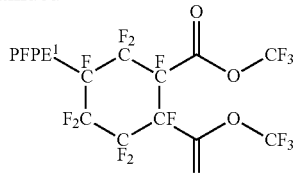

G$^1$ =
CF$_3$—O—(CF$_2$CF$_2$O—CF$_2$CF$_2$CF$_2$O)$_x$CF$_2$CF$_2$O—CF$_2$CF$_2$CF$_2$CH$_2$—

PFPE$^1$ =
CF$_3$—O—(CF$_2$CF$_2$O—CF$_2$CF$_2$CF$_2$O)$_x$CF$_2$CF$_2$O—CF$_2$CF$_2$CF$_2$CF$_2$O—

NMR spectrum of compound 6-2:
$^{19}$F-NMR (282.7 MHz, solvent: CDCl$_3$, reference: CFCl$_3$) δ (ppm): −55 (3F), −57 (6F), −83 (50F), −88 (52F), −91 (2F), −120 to 130 (61F).

Mean value of unit number x: 13.

Ex. 2-3

Into a 50 mL eggplant flask, 3.0 g of the compound 6-2 obtained in Ex. 2-2, 10 g of SR-solvent and 0.8 g of allylamine were put, followed by stirring at 25° C. overnight. The reaction crude liquid was subjected to filtration, and SR-solvent was distilled off under reduced pressure from the filtrate to obtain 2.6 g (yield: 90%) of compound 2-2.

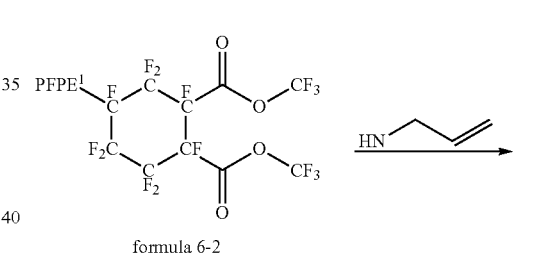

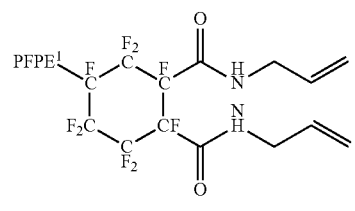

PFPE$^1$ =
CF$_3$—O—(CF$_2$CF$_2$O—CF$_2$CF$_2$CF$_2$O)$_x$CF$_2$CF$_2$O—CF$_2$CF$_2$CF$_2$CF$_2$O—

NMR spectrum of compound 2-2:
$^1$H-NMR (300.4 MHz, solvent: CDCl$_3$, reference: TMS) δ (ppm): 5.8 (2H), 5.2 (4H), 4.0 (4H).
$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13.

Ex. 2-4

In the same manner as in Ex. 1-6 except that 1.1 g of the compound 2-2 obtained in Ex. 2-3 was used instead of 1.0 g of the compound 2-1, 1.1 g (yield: 100%) of compound 1-2 was obtained.

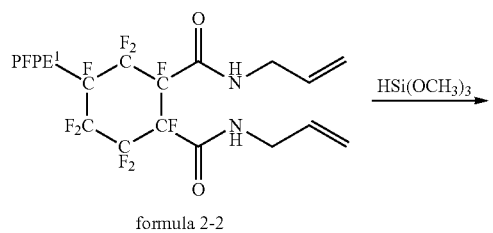

formula 2-2

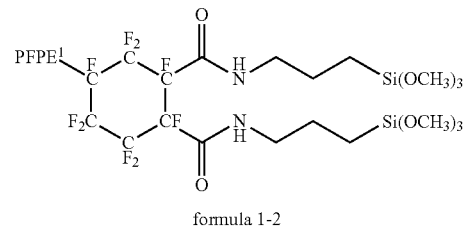

formula 1-2

PFPE$^1$ =
CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 1-2:
$^1$H-NMR (300.4 MHz, solvent: CDCl$_3$, reference: TMS) δ (ppm): 3.6 (18H), 3.4 (4H), 1.7 (4H), 0.7 (4H).
$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).
Mean value of unit number x: 13, number average molecular weight of compound 1-2: 4,700.

Ex. 3

Ex. 3-1

Into a 50 mL eggplant flask, 2 g of compound 20-2, 4.5 g of perfluorodivinyl butyl ether, 0.7 g of a 48% potassium hydroxide aqueous solution, 1.3 g of deionized water and 0.2 g of t-butanol were put, followed by stirring at 85° C. for 12 hours. 2.0 g of 1 mol/L hydrochloric acid was put, and liquid separation was carried out with AC-6000. The AC-6000 phase was washed with deionized water and with saturated salt water, dehydrated over magnesium sulfate and subjected to filtration, and the filtrate was concentrated. The obtained reaction crude liquid was purified by column chromatography to obtain 3.0 g (yield: 46%) of compound 9-1.

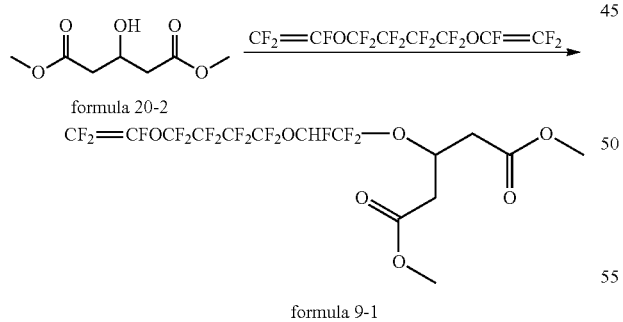

formula 20-2 formula 9-1

NMR spectrum of compound 9-1:
$^1$H-NMR (300.4 MHz, solvent: CDCl$_3$, reference: TMS) δ (ppm): 6.2 to 5.8 (1H), 4.5 (1H), 3.9 (6H), 2.3 (4H).
$^{19}$F-NMR (282.7 MHz, solvent: CDCl$_3$, reference: CFCl$_3$) δ (ppm): −85 to −87 (2F), −93 (2F), −114 (1F), −122 (1F), −126 (4F), −136 (1F), −145 (1F).

Ex. 3-2

Into a 500 mL eggplant flask, 2.3 g of the compound 9-1 obtained in Ex. 3-1, 20 g of the compound 3-1 obtained in Ex. 1-1, 0.3 g of a 48% potassium hydroxide aqueous solution, 0.5 g of deionized water and 2.0 g t-butanol were put, followed by stirring at 85° C. for 12 hours. 1.0 g of 1 mol/L hydrochloric acid was put, and liquid separation was carried out with AC-6000. The AC-6000 phase was washed with deionized water and with saturated salt water, dehydrated over magnesium sulfate and subjected to filtration, and the filtrate was concentrated. The obtained reaction crude liquid was purified by column chromatography to obtain 22 g (yield: 99%) of compound 5-3.

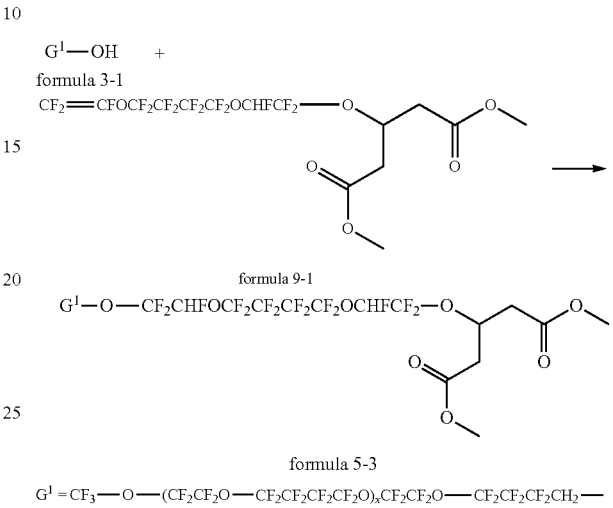

formula 3-1
CF$_2$=CFOCF$_2$CF$_2$CF$_2$CF$_2$OCHFCF$_2$— formula 9-1
G$^1$—O—CF$_2$CHFOCF$_2$CF$_2$CF$_2$CF$_2$OCHFCF$_2$— formula 5-3
G$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CH$_2$—

NMR spectrum of compound 5-3:
$^1$H-NMR (300.4 MHz, solvent: CDCl$_3$, reference: TMS) δ (ppm): 6.2 to 5.8 (1H), 4.5 (3H), 3.9 (6H), 3.5 (1H), 2.3 (4H).
$^{19}$F-NMR (282.7 MHz, solvent: CDCl$_3$, reference: CFCl$_3$) δ (ppm): −55 (3F), −83 (50F), −85 to −87 (2F), −88 (50F), −91 (2F), −93 (2F), −114 (1F), −120 (2F), −122 (1F), −126 (52F), −127 (2F), −136 (1F), −145 (1F).
Mean value of unit number x: 13.

Ex. 3-3

In the same manner as in Ex. 1-4 except that a CFE-419 solution (concentration: 10%, compound 5-3: 10.0 g) of compound 5-3 obtained in Ex. 3-2 was used instead of the CFE-419 solution (concentration: 10%, compound 5-1: 6.0 g) of the compound 5-1, 12 g (yield: 90%) of compound 6-3 was obtained.

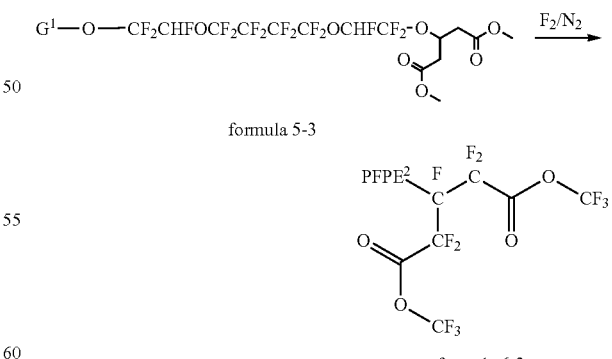

formula 5-3 formula 6-3

NMR spectrum of compound 6-3:
$^{19}$F-NMR (282.7 MHz, solvent: CDCl$_3$, reference: CFCl$_3$) δ (ppm): −55 (3F), −57 (6F), −83 (56F), −88 (64F), −120 to 130 (55F).
Mean value of unit number x: 13.

Ex. 3-4

In the same manner as in Ex. 1-5 except that the compound 6-3 obtained in Ex. 3-3 was used instead of the compound 6-1, 1.3 g (yield: 82%) of compound 2-3 was obtained.

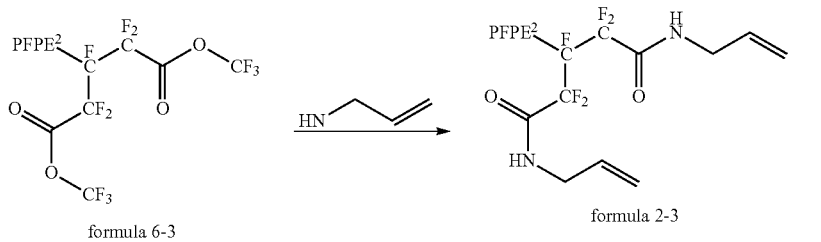

formula 6-3 → formula 2-3

$PFPE^2 = CF_3-O-(CF_2CF_2O-CF_2CF_2CF_2CF_2O)_xCF_2CF_2O-CF_2CF_2CF_2CF_2O-CF_2CF_2OCF_2CF_2CF_2CF_2CF_2OCF_2CF_2O-$

NMR spectrum of compound 2-3:
$^1$H-NMR (300.4 MHz, solvent: CDCl$_3$, reference: TMS) δ (ppm): 5.8 (2H), 5.2 (4H), 4.0 (4H).
$^{19}$F-NMR (282.7 MHz, solvent: CDCl$_3$, reference: CFCl$_3$) δ (ppm): −55 (3F), −83 (56F), −88 (64F), −120 to 130 (55F).
Mean value of unit number x: 13.

Ex. 3-5

Into a 50 mL eggplant flask, 1 g of the compound 2-3 obtained in Ex. 3-4, 0.09 g of trimethoxysilane, 0.0009 g of aniline, 1.0 g of AC-6000 and 0.0033 g of a platinum/1,3-divinyl-1,1,3,3-tetramethyldisiloxane complex were put, followed by stirring at 25° C. overnight. The reaction mixture was concentrated to obtain 1.0 g (yield: 100%) of compound 1-3.

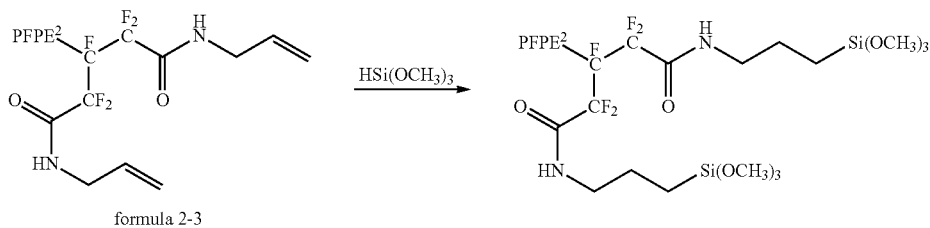

formula 2-3

$PFPE^2 = CF_3-O-(CF_2CF_2O-CF_2CF_2CF_2CF_2O)_xCF_2CF_2O-CF_2CF_2CF_2CF_2O-CF_2CF_2OCF_2CF_2CF_2CF_2CF_2OCF_2CF_2O-$

NMR spectrum of compound 1-3:
$^1$H-NMR (300.4 MHz, solvent: CDCl$_3$, reference: TMS) δ (ppm): 3.6 (18H), 3.4 (4H), 1.7 (4H), 0.7 (4H).
$^{19}$F-NMR (282.7 MHz, solvent: CDCl$_3$, reference: CFCl$_3$) δ (ppm): −55 (3F), −83 (56F), −88 (64F), −120 to 130 (55F).
Mean value of unit number x: 13, number average molecular weight of compound 1-3: 5,700.

Ex. 4

Ex. 4-1

Into a 500 mL eggplant flask, 50 g of the compound 6-1 obtained in Ex. 1-4 and 200 mL of SR-solvent were put, shielded from light and cooled in an ice bath. 12 g of sodium pyrithione was put, and the ice bath was removed, followed by stirring at 25° C. for 2 hours. 24 g of iodine and 2.7 g of 2,2'-azobis(2-methylbutyronitrile) were put, the reaction mixture was unshielded from light, followed by stirring at 85° C. for 12 hours. Liquid separation was carried out with methanol and AC-6000, and the AC-6000 phase was concentrated. The obtained reaction crude liquid was purified by column chromatography to obtain 36 g (yield: 72%) of compound 7-1.

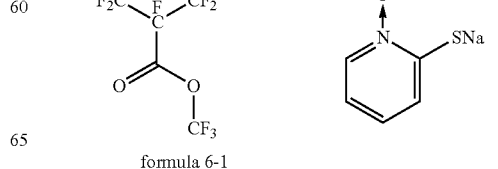

formula 6-1

-continued

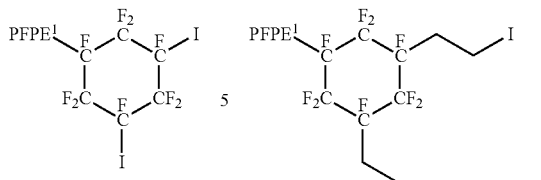

formula 7-1

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 7-1:

$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13.

Ex. 4-2

Into a 25 mL metal reactor (SS-4CS-TW-25), 5.0 g of the compound 7-1 obtained in Ex. 4-1, 0.2 g of 2,2′-azobis(2-methylbutyronitrile) and 1.8 mL of SR-solvent were put, and the reactor was filled with ethylene under 0.20 MPa [gauge], followed by stirring at 80° C. for 5 hours. The obtained reaction crude liquid was purified by column chromatography to obtain 5 g (yield: 100%) of compound 8-1.

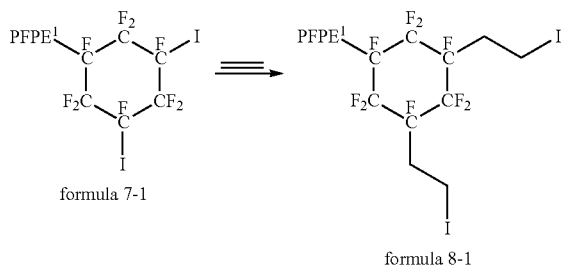

formula 7-1 → formula 8-1

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 8-1:

$^1$H-NMR (300.4 MHz, solvent: CDCl$_3$, reference: TMS) δ (ppm): 3.1 (4H), 2.6 (4H).

$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13.

Ex. 4-3

Into a 100 mL eggplant flask, 5.0 g of the compound 8-1 obtained in Ex. 4-2, 0.5 g of diazabicycloundecene and 10 mL of SR-solvent were put, followed by stirring at 80° C. for 18 hours. The obtained reaction crude liquid was purified by column chromatography to obtain 4.9 g (yield: 100%) of compound 2-4.

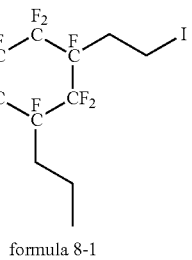

formula 8-1

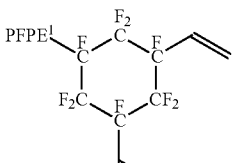

formula 2-4

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 2-4:

$^1$H-NMR (300.4 MHz, solvent: CDCl$_3$, reference: TMS) δ (ppm): 5.9 (4H), 5.6 (2H). $^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13.

Ex. 4-4

In the same manner as in Ex. 1-6 except that 1.1 g of the compound 2-4 obtained in Ex. 4-3 was used instead of 1.0 g of the compound 2-1, 1.1 g (yield: 100%) of compound 1-4 was obtained.

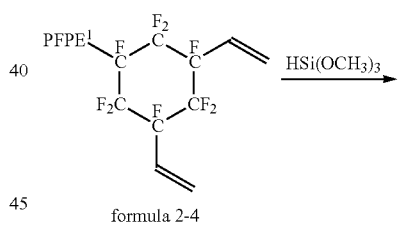

formula 2-4

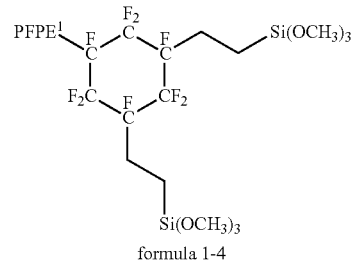

formula 1-4

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 1-4:

$^1$H-NMR (300.4 MHz, solvent: CDCl$_3$, reference: TMS) δ (ppm): 3.6 (18H), 2.5 (4H), 0.7 (4H).

$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13, number average molecular weight of compound 1-4: 5,300.

Ex. 5

Ex. 5-1

In the same manner as in Ex. 4-1 except that the compound 6-2 obtained in Ex. 2-2 was used instead of the compound 6-1, 35 g (yield: 70%) of compound 7-2 was obtained.

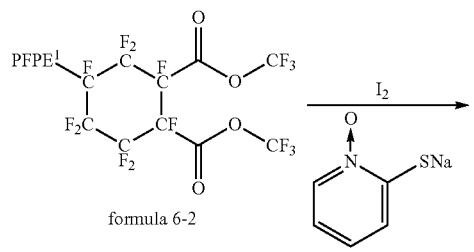

formula 6-2 formula 7-2

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 7-2:

$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13.

Ex. 5-2

In the same manner as in Ex. 4-2 except that the compound 7-2 obtained in Ex. 5-1 was used instead of the compound 7-1, 5 g (yield: 100%) compound 8-2 was obtained.

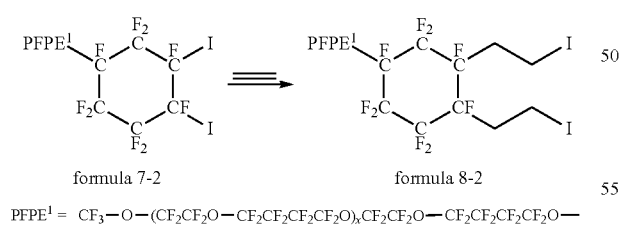

formula 7-2     formula 8-2

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 8-2:

$^1$H-NMR (300.4 MHz, solvent: CDCl$_3$, reference: TMS) δ (ppm): 3.1 (4H), 2.6 (4H).

$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13.

Ex. 5-3

In the same manner as in Ex. 4-3 except that the compound 8-2 obtained in Ex. 5-2 was obtained instead of the compound 8-1, 4.9 g (yield: 100%) of compound 2-5 was obtained.

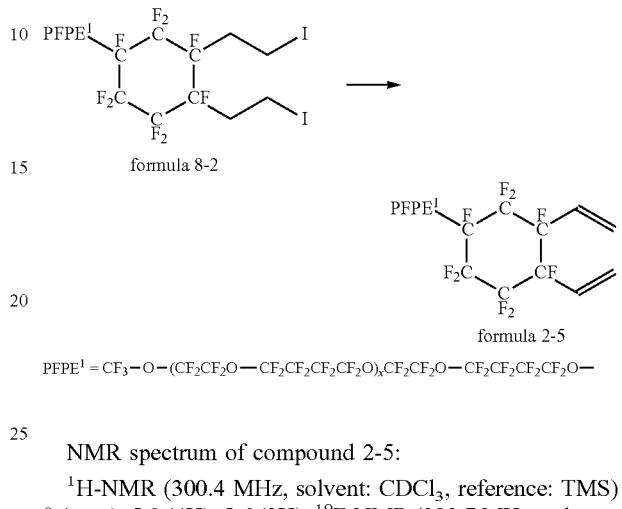

formula 8-2 formula 2-5

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 2-5:

$^1$H-NMR (300.4 MHz, solvent: CDCl$_3$, reference: TMS) δ (ppm): 5.9 (4H), 5.6 (2H). $^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13.

Ex. 5-4

In the same manner as in Ex. 4-4 except that the compound 2-5 obtained in Ex. 5-3 was used instead of the compound 2-4, 1.1 g (yield: 100%) of compound 1-5 was obtained.

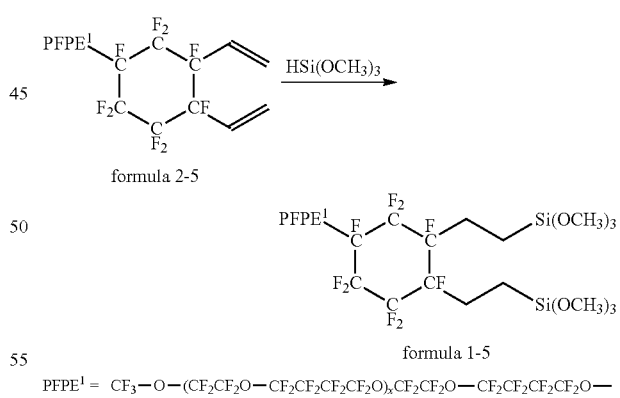

formula 2-5 formula 1-5

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 1-5:

$^1$H-NMR (300.4 MHz, solvent: CDCl$_3$, reference: TMS) δ (ppm): 3.6 (18H), 2.5 (4H), 0.7 (4H).

$^{19}$F-NMR (282.7 MHz, solvent: CDCl$_3$, reference: CFCl$_3$) δ (ppm): −55 (3F), −83 (50F), −88 (52F), −91 (2F), −120 to 130 (61F).

Mean value of unit number x: 13, number average molecular weight of compound 1-5: 5,300.

Ex. 6

Ex. 6-1

In the same manner as in Ex. 4-1 except that the compound 6-3 obtained in Ex. 3-3 was used instead of the compound 6-1, 37 g (yield: 75%) of compound 7-3 was obtained.

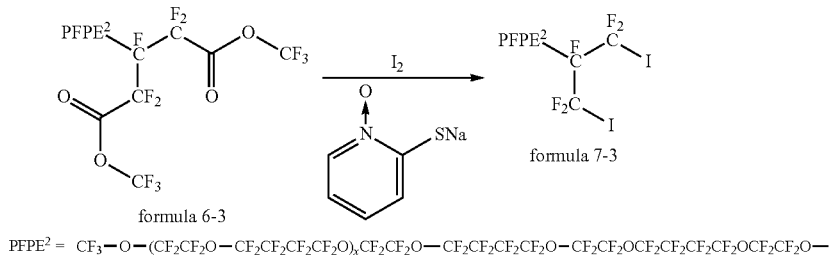

formula 6-3 → formula 7-3

$PFPE^2$ = $CF_3-O-(CF_2CF_2O-CF_2CF_2CF_2CF_2O)_xCF_2CF_2O-CF_2CF_2CF_2CF_2O-CF_2CF_2OCF_2CF_2CF_2CF_2OCF_2CF_2O-$

NMR spectrum of compound 7-3:
$^{19}$F-NMR (282.7 MHz, solvent: CDCl$_3$, reference: CFCl$_3$) δ (ppm): −55 (3F), −59 (4H), −83 (52F), −88 (64F), −120 to 130 (55F).
Mean value of unit number x: 13.

Ex. 6-2

In the same manner as in Ex. 4-2 except that the compound 7-3 obtained in Ex. 6-1 was used instead of the compound 7-1, 5 g (yield: 100%) of compound 8-3 was obtained.

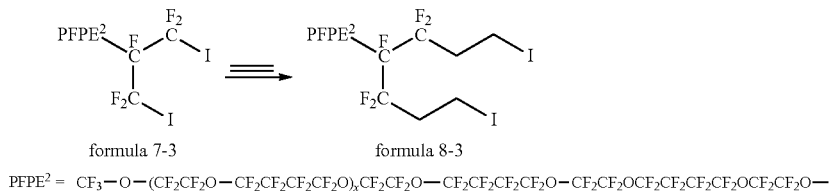

formula 7-3 → formula 8-3

$PFPE^2$ = $CF_3-O-(CF_2CF_2O-CF_2CF_2CF_2CF_2O)_xCF_2CF_2O-CF_2CF_2CF_2CF_2O-CF_2CF_2OCF_2CF_2CF_2CF_2OCF_2CF_2O-$

NMR spectrum of compound 8-3:
$^1$H-NMR (300.4 MHz, solvent: CDCl$_3$, reference: TMS) δ (ppm): 3.1 (4H), 2.6 (4H).
$^{19}$F-NMR (282.7 MHz, solvent: CDCl$_3$, reference: CFCl$_3$) δ (ppm): −55 (3F), −83 (52F), −88 (64F) −116 (4F), −120 to 130 (55F).
Mean value of unit number x: 13.

Ex. 6-3

In the same manner as in Ex. 4-3 except that the compound 8-3 obtained in Ex. 6-2 was used instead of the compound 8-1, 4.9 g (yield: 100%) of compound 2-6 was obtained.

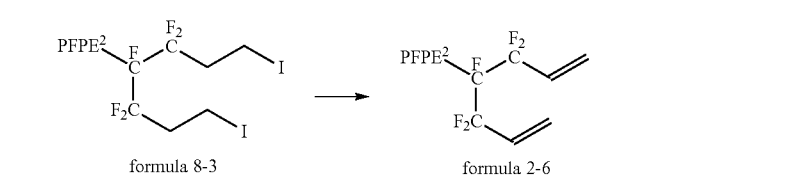

formula 8-3 → formula 2-6

$PFPE^2$ = $CF_3-O-(CF_2CF_2O-CF_2CF_2CF_2CF_2O)_xCF_2CF_2O-CF_2CF_2CF_2CF_2O-CF_2CF_2OCF_2CF_2CF_2CF_2OCF_2CF_2O-$

NMR spectrum of compound 2-6:
$^1$H-NMR (300.4 MHz, solvent: CDCl$_3$, reference: TMS) δ (ppm): 5.9 (4H), 5.6 (2H).
$^{19}$F-NMR (282.7 MHz, solvent: CDCl$_3$, reference: CFCl$_3$) δ (ppm): −55 (3F), −83 (52F), −88 (64F) −116 (4F), −120 to 130 (55F).

Mean value of unit number x: 13.

Ex. 6-4

In the same manner as in Ex. 4-4 except that the compound 2-6 obtained in Ex. 6-3 was used instead of the compound 2-4, 1.1 g (yield: 100%) of compound 1-6 was obtained.

$$\text{PFPE}^2\text{-CF(CF}_2\text{)-C(F}_2\text{)-CH=CH}_2 \;/\; \text{CH=CH}_2 \xrightarrow{\text{HSi(OCH}_3)_3} \text{PFPE}^2\text{-CF(CF}_2\text{)-C(F}_2\text{)-CH}_2\text{CH}_2\text{Si(OCH}_3)_3 \;/\; \text{CH}_2\text{CH}_2\text{Si(OCH}_3)_3$$

formula 2-6 → formula 1-6

PFPE$^2$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—CF$_2$CF$_2$OCF$_2$CF$_2$CF$_2$CF$_2$OCF$_2$CF$_2$O—

NMR spectrum of compound 1-6:
$^1$H-NMR (300.4 MHz, solvent: CDCl$_3$, reference: TMS) δ (ppm): 3.6 (18H), 2.5 (4H), 0.7 (4H).
$^{19}$F-NMR (282.7 MHz, solvent: CDCl$_3$, reference: CFCl$_3$) δ (ppm): −55 (3F), −83 (52F), −88 (64F) −116 (4F), −120 to 130 (55F).

Mean value of unit number x: 13, number average molecular weight of compound 1-6: 5,600.

Ex. 7

Ex. 7-1

Into a 100 mL eggplant flask, 10 g of the compound 3-1 obtained in Ex. 1-1, 0.3 g of diethyl maleate and 0.5 g of sodium hydride were put, followed by stirring at 25° C. for 16 hours. 1N hydrochloric acid was added, liquid separation was carried out with AE-3000, and the obtained organic phase was dehydrated over magnesium sulfate. Magnesium sulfate was removed by filtration to obtain 6.9 g (yield: 67%) of compound 5-4.

$$G^1\text{—OH} + \text{diethyl maleate} \longrightarrow G^1\text{—O—CH(C(O)OCH}_2\text{CH}_3\text{)—CH}_2\text{—C(O)OCH}_2\text{CH}_3$$

formula 3-1 → formula 5-4

G$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CH$_2$—

NMR spectrum of compound 5-4:

$^1$H-NMR (300.4 MHz, solvent: CDCl$_3$, reference: TMS) δ (ppm): 4.5 (1H), 4.1 (2H), 3.9 (4H), 2.4 (2H), 1.4 (6H).

$^{19}$F-NMR (282.7 MHz, solvent: CDCl$_3$, reference: CFCl$_3$) δ (ppm): −55 (3F), −83 (50F), −88 (50F), −91 (2F), −120 to 130 (54F).

Mean value of unit number x: 13.

Ex. 7-2

In the same manner as in Ex. 1-4 except that the compound 5-4 obtained in Ex. 7-1 was used instead of the compound 5-1, 5.9 g compound 6-4 was obtained.

$$\text{formula 5-4} \xrightarrow{F_2/N_2} \text{formula 6-4}$$

$$\text{PFPE}^1\text{—CF(C(F}_2\text{)C(O)OCF}_2\text{CF}_3\text{)—C(O)OCF}_2\text{CF}_3$$

formula 6-4

G$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CH$_2$—

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 6-4:

$^{19}$F-NMR (282.7 MHz, solvent: CDCl$_3$, reference: CFCl$_3$) δ (ppm): −55 (3F), −83 (52F), −88 (56F), −91 (6F), −120 to 130 (57F).

Mean value of unit number x: 13.

Ex. 7-3

In the same manner as in Ex. 1-5 except that the compound 6-4 obtained in Ex. 7-2 was used instead of the compound 6-1, 4.8 g compound 2-7 was obtained.

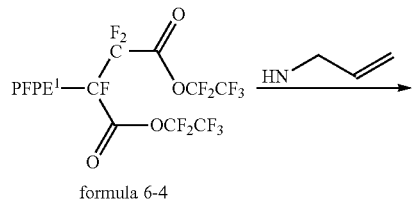

formula 6-4

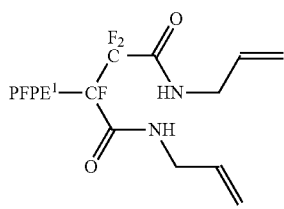

formula 2-7

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 2-7:
$^1$H-NMR (300.4 MHz, solvent: CDCl$_3$, reference: TMS) δ (ppm): 5.8 (2H), 5.2 (4H), 4.0 (4H).
$^{19}$F-NMR (282.7 MHz, solvent: CDCl$_3$, reference: CFCl$_3$) δ (ppm): −55 (3F), −83 (52F), −88 (50F), −91 (2F), −120 to 130 (57F).
Mean value of unit number x: 13.

Ex. 7-4

In the same manner as in Ex. 1-6 except that the compound 2-7 obtained in Ex. 7-3 was used instead of the compound 2-1, 1.0 g compound 1-7 was obtained.

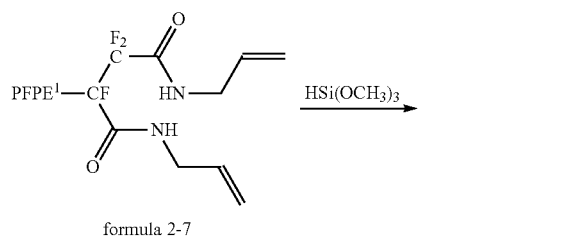

formula 2-7

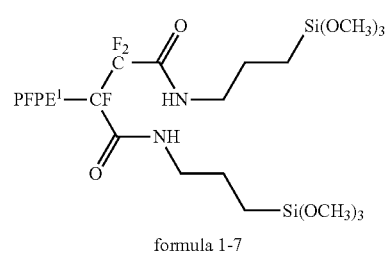

formula 1-7

PFPE$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 1-7:
$^1$H-NMR (300.4 MHz, solvent: CDCl$_3$, reference: TMS) δ (ppm): 3.6 (18H), 3.4 (4H), 1.7 (4H), 0.7 (4H).
$^{19}$F-NMR (282.7 MHz, solvent: CDCl$_3$, reference: CFCl$_3$) δ (ppm): −55 (3F), −83 (52F), −88 (50F), −91 (2F), −120 to 130 (57F).
Mean value of unit number x: 13, number average molecular weight of compound 1-7: 4,900.

Ex. 8

Ex. 8-1

Into a 100 mL eggplant flask, 10 g of the compound 3-1 obtained in Ex. 1-1, 0.3 g of 3-chloromethyl-3-methyloxetane and 0.5 g of a 48 mass % potassium hydroxide aqueous solution were put, followed by stirring at 60° C. for 24 hours. 1N hydrochloric acid was added, liquid separation was carried out with AE-3000, and the obtained organic phase was dehydrated over magnesium sulfate. Magnesium sulfate was removed by filtration, the solvent was distilled off, and the residue was purified by silica gel column chromatography to obtain 6.5 g (yield: 64%) of compound 10-1.

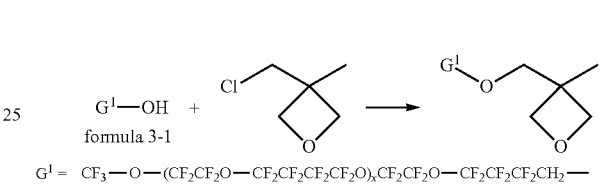

formula 3-1

G$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CH$_2$—

NMR spectrum of compound 10-1:
$^1$H-NMR (300.4 MHz, solvent: CDCl$_3$, reference: TMS) δ (ppm): 4.5 (4H), 3.7 (2H), 3.2 (2H), 1.3 (3H).
$^{19}$F-NMR (282.7 MHz, solvent: CDCl$_3$, reference: CFCl$_3$) δ (ppm): −55 (3F), −83 (50F), −88 (50F), −91 (2F), −120 to 130 (54F).
Mean value of unit number x: 13.

Ex. 8-2

Into a 100 mL eggplant flask, 6 g of the compound 10-1 obtained in Ex. 8-1, 10 g of AC-2000, 0.6 g of concentrated sulfuric acid and 0.6 g of deionized water were put, followed by stirring at 25° C. for 8 hours. The obtained crude liquid was washed with water, and the solvent was distilled off to obtain 6 g (yield: 100%) of compound 11-1.

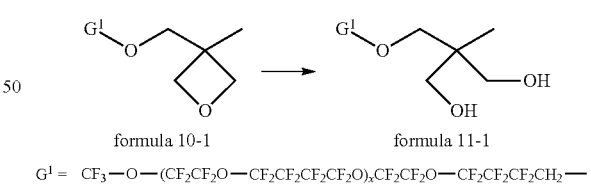

formula 10-1    formula 11-1

G$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CH$_2$—

NMR spectrum of compound 11-1:
$^1$H-NMR (300.4 MHz, solvent: CDCl$_3$, reference: TMS) δ (ppm): 4.2 (4H), 3.7 (2H), 3.2 (2H), 1.3 (3H).
$^{19}$F-NMR (282.7 MHz, solvent: CDCl$_3$, reference: CFCl$_3$) δ (ppm): −55 (3F), −83 (50F), −88 (50F), −91 (2F), −120 to 130 (54F).
Mean value of unit number x: 13.

Ex. 8-3

Into a 100 mL eggplant flask made of a tetrafluoroethylene/perfluoro(alkoxy vinyl ether) copolymer, 6 g of the compound 11-1 obtained in Ex. 8-2, 20 g of AC-2000 and 2 g of NaF were put, followed by stirring at 25° C. Then, 4 g of CF$_3$CF$_2$CF$_2$OCF(CF$_3$)COF was put at a rate to keep an internal temperature of at most 40° C., followed by stirring at 25° C. further for 16 hours. The reaction mixture was subjected to filtration, the filtrate was recovered, and the solvent was distilled off to obtain 6 g (yield: 89%) of compound 5-5.

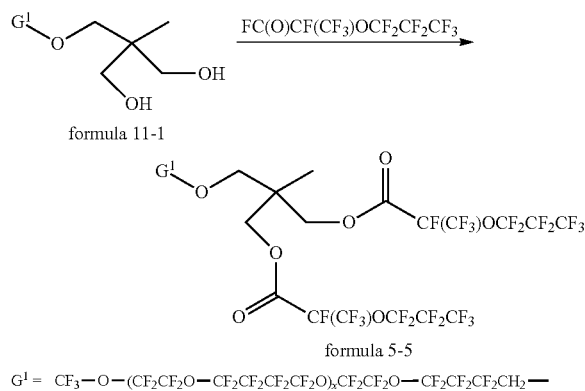

NMR spectrum of compound 5-5:
$^1$H-NMR (300.4 MHz, solvent: CDCl$_3$, reference: TMS) δ (ppm): 4.4 (4H), 3.7 (2H), 3.2 (2H), 1.3 (3H).
$^{19}$F-NMR (282.7 MHz, solvent: CDCl$_3$, reference: CFCl$_3$) δ (ppm): −55 (3F), −83 (66F), −88 (50F), −91 (2F), −120 to 130 (58F), −145 (2F).
Mean value of unit number x: 13.

Ex. 8-4

In the same manner as in Ex. 1-4 except that the compound 5-5 obtained in Ex. 8-3 was used instead of the compound 5-1, 5.5 g (yield: 90%) of compound 6-5 was obtained.

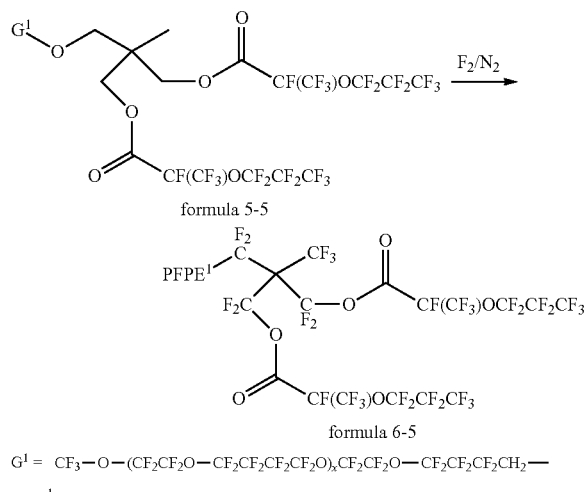

NMR spectrum of compound 6-5:
$^{19}$F-NMR (282.7 MHz, solvent: CDCl$_3$, reference: CFCl$_3$) δ (ppm): −55 (3F), −83 (69F), −88 (58F), −91 (2F), −120 to 130 (58F), −145 (2F).
Mean value of unit number x: 13.

Ex. 8-5

In the same manner as in Ex. 1-5 except that the compound 6-5 obtained in Ex. 8-4 was used instead of the compound 6-1, 4.8 g (yield: 99%) of compound 2-8 was obtained.

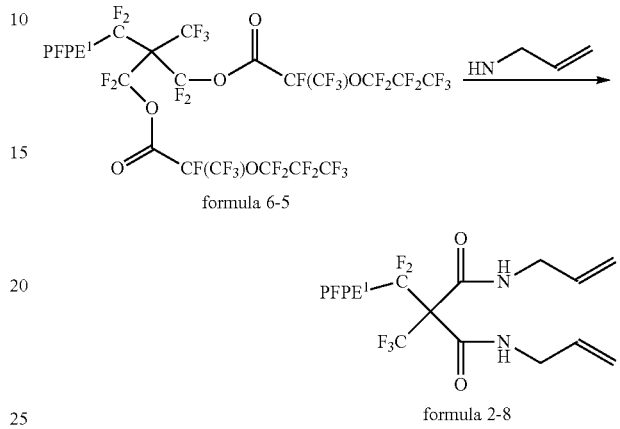

NMR spectrum of compound 2-8:
$^1$H-NMR (300.4 MHz, solvent: CDCl$_3$, reference: TMS) δ (ppm): 5.8 (2H), 5.2 (4H), 4.0 (4H).
$^{19}$F-NMR (282.7 MHz, solvent: CDCl$_3$, reference: CFCl$_3$) δ (ppm): −55 (3F), −83 (53F), −88 (54F), −91 (2F), −120 to 130 (54F).
Mean value of unit number x: 13.

Ex. 8-6

In the same manner as in Ex. 1-6 except that the compound 2-8 obtained in Ex. 8-5 was used instead of the compound 2-1, 1.0 g (yield: 100%) of compound 1-8 was obtained.

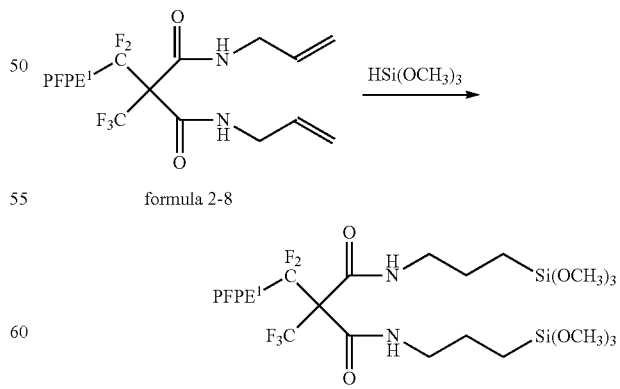

NMR spectrum of compound 1-8:

¹H-NMR (300.4 MHz, solvent: CDCl$_3$, reference: TMS) δ (ppm): 3.6 (18H), 3.4 (4H), 1.7 (4H), 0.7 (4H).

¹⁹F-NMR (282.7 MHz, solvent: CDCl$_3$, reference: CFCl$_3$) δ (ppm): −55 (3F), −83 (53F), −88 (54F), −91 (2F), −120 to 130 (54F).

Mean value of unit number x: 13, number average molecular weight of compound 1-8: 5,100.

Ex. 9

Ex. 9-1

Into a 100 mL eggplant flask, 10 g of the compound 3-1 obtained in Ex. 1-1, 8 g of CF$_2$=CFOCF$_2$CF$_2$CF$_2$CF$_2$OCF=CF$_2$, 15 g of 2-methyl-2-propanol, 3 g of a 48 mass % potassium hydroxide aqueous solution and 4 g of water were put, followed by stirring at 70° C. for 48 hours. The mixture was cooled to 25° C., methanol was put, followed by sufficient stirring, and AC-6000 was put, followed by sufficient stirring. The AC-6000 layer was recovered, the solvent was distilled off, and the residue was purified by silica gel column chromatography to obtain 9.2 g (yield: 87%) of compound 12-1.

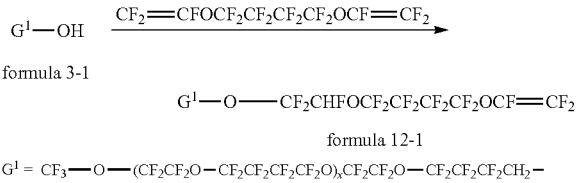

NMR spectrum of compound 12-1:
¹H-NMR (300.4 MHz, solvent: CDCl$_3$, reference: TMS) δ (ppm): 6.0 (1H), 4.5 (2H).
¹⁹F-NMR (282.7 MHz, solvent: CDCl$_3$, reference: CFCl$_3$) δ (ppm): −55 (3F), −83 (54F), −88 (56F), −91 (2F), −115 to 135 (57F), −145 (1F).
Mean value of unit number x: 13.

Ex. 9-2

Into a 100 mL eggplant flask, 0.8 g of a 20 mass % sodium ethoxide ethanol solution and 0.4 g of diethyl malonate were put, followed by stirring at 25° C. for one hour. Then, 9 g of the compound 12-1 obtained in Ex. 9-1 was put, followed by stirring at 40° C. for 24 hours. The reaction mixture was cooled to 25° C., 1N hydrochloric acid was put, followed by sufficient stirring, and AC-6000 was put, followed by sufficient stirring. The AC-6000 layer was recovered, the solvent was distilled off, and the residue was purified by silica gel column chromatography to obtain 7.6 g (yield: 83%) of compound 5-6.

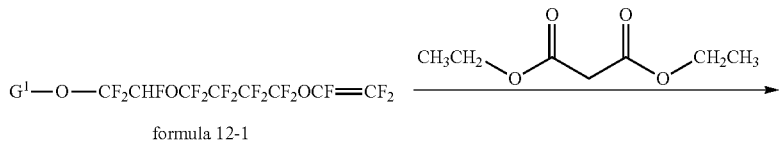

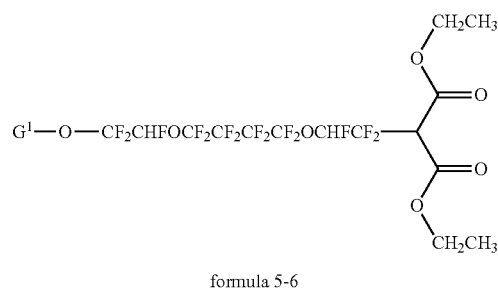

NMR spectrum of compound 5-6:
¹H-NMR (300.4 MHz, solvent: CDCl$_3$, reference: TMS) δ (ppm): 6.0 to 5.8 (2H), 4.5 (2H), 4.2 (4H), 3.5 (1H), 1.3 (6H).

¹⁹F-NMR (282.7 MHz, solvent: CDCl$_3$, reference: CFCl$_3$) δ (ppm): −55 (3F), −83 (54F), −88 (56F), −91 (2F), −115 to 135 (56F), −145 (2F).

Mean value of unit number x: 13.

Ex. 9-3

In the same manner as in Ex. 1-4 except that the compound 5-6 obtained in Ex. 9-2 was used instead of the compound 5-1, 5.3 g (yield: 87%) of compound 6-6 was obtained.

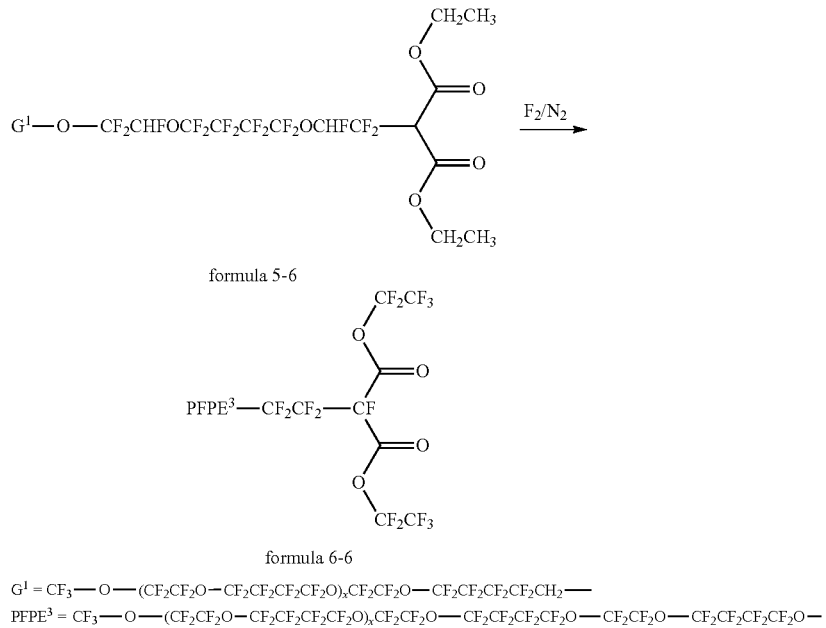

$G^1$ = $CF_3$—O—$(CF_2CF_2O$—$CF_2CF_2CF_2CF_2O)_x CF_2CF_2O$—$CF_2CF_2CF_2CF_2CH_2$—

$PFPE^3$ = $CF_3$—O—$(CF_2CF_2O$—$CF_2CF_2CF_2CF_2O)_x CF_2CF_2O$—$CF_2CF_2CF_2O$—$CF_2CF_2O$—$CF_2CF_2CF_2CF_2O$—

NMR spectrum of compound 6-6:
$^{19}$F-NMR (282.7 MHz, solvent: CDCl$_3$, reference: CFCl$_3$) δ (ppm): −55 (3F), −83 (54F), −85 (6F), −88 (64F), −91 (2F), −115 to 135 (57F).
Mean value of unit number x: 13.

Ex. 9-4

In the same manner as in Ex. 1-5 except that the compound 6-6 obtained in Ex. 9-3 was used instead of the compound 6-1, 4.9 g (yield: 96%) of compound 2-9 was obtained.

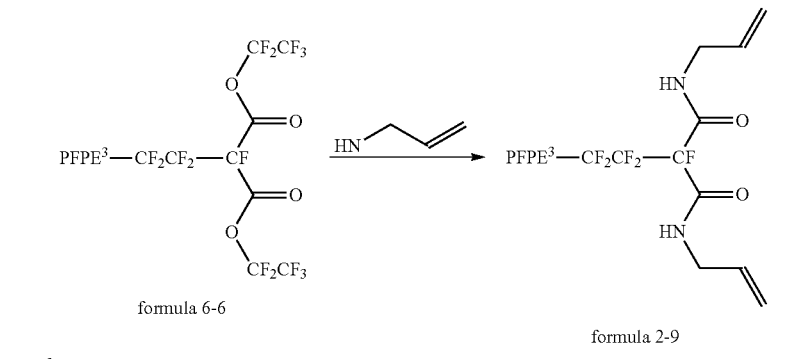

$PFPE^3$ = $CF_3$—O—$(CF_2CF_2O$—$CF_2CF_2CF_2CF_2O)_x CF_2CF_2O$—$CF_2CF_2CF_2O$—$CF_2CF_2O$—$CF_2CF_2CF_2CF_2O$—

NMR spectrum of compound 2-9:
$^1$H-NMR (300.4 MHz, solvent: CDCl$_3$, reference: TMS) δ (ppm): 5.8 (2H), 5.2 (4H), 4.0 (4H).
$^{19}$F-NMR (282.7 MHz, solvent: CDCl$_3$, reference: CFCl$_3$) δ (ppm): −55 (3F), −83 (54F), −88 (60F), −91 (2F), −115 to 135 (57F).
Mean value of unit number x: 13.

Ex. 9-5

In the same manner as in Ex. 1-6 except that the compound 2-9 obtained in Ex. 9-4 was used instead of the compound 2-1, 1.0 g (yield: 100%) of compound 1-9 was obtained.

formula 2-9 → (HSi(OCH$_3$)$_3$) → formula 1-9

PFPE$^3$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—CF$_2$CF$_2$O—CF$_2$CF$_2$CF$_2$CF$_2$O—

NMR spectrum of compound 1-9:
$^1$H-NMR (300.4 MHz, solvent: CDCl$_3$, reference: TMS) δ (ppm): 3.6 (18H), 3.4 (4H), 1.7 (4H), 0.7 (4H).
$^{19}$F-NMR (282.7 MHz, solvent: CDCl$_3$, reference: CFCl$_3$) δ (ppm): −55 (3F), −83 (54F), −88 (60F), −91 (2F), −115 to 135 (57F).
Mean value of unit number x: 13, number average molecular weight of compound 1-9: 4,750.

Ex. 10

Ex. 10-1

Into a 100 mL eggplant flask, 10 g of the compound 3-1 obtained in Ex. 1-1, 0.3 g of diethyl itaconate and 0.5 g of sodium hydride were put, followed by stirring at 25° C. for 16 hours. 1N hydrochloric acid was added, liquid separation was carried out with AE-3000, and the obtained organic phase was dehydrated over magnesium sulfate. Magnesium sulfate was removed by filtration to obtain 7.6 g (yield: 73%) of compound 5-7.

G$^1$—OH + (diethyl itaconate) → formula 5-7 formula 3-1

G$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CH$_2$—

NMR spectrum of compound 5-7:
$^1$H-NMR (300.4 MHz, solvent: CDCl$_3$, reference: TMS) δ (ppm): 4.2 (2H), 4.0 (2H), 3.9 (4H), 2.3 (3H)-1.4 (6H).
$^{19}$F-NMR (282.7 MHz, solvent: CDCl$_3$, reference: CFCl$_3$) δ (ppm): −55 (3F), −83 (50F), −88 (50F), −91 (2F), −120 to 130 (54F).
Mean value of unit number x: 13.

Ex. 10-2

In the same manner as in Ex. 1-4 except that the compound 5-7 obtained in Ex. 10-1 was used instead of the compound 5-1, 5.8 g (yield: 84%) of compound 6-7 was obtained.

formula 5-7 → (F$_2$/N$_2$) → formula 6-7

G$^1$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CH$_2$—
PFPE$^3$ = CF$_3$—O—(CF$_2$CF$_2$O—CF$_2$CF$_2$CF$_2$CF$_2$O)$_x$CF$_2$CF$_2$O—CF$_2$CF$_2$CF$_2$CF$_2$O—

NMR spectrum of compound 6-7:
$^{19}$F-NMR (282.7 MHz, solvent: CDCl$_3$, reference: CFCl$_3$) δ (ppm): −55 (3F), −83 (54F), −88 (56F), −91 (6F), −120 to 130 (57F).
Mean value of unit number x: 13.

Ex. 10-3

In the same manner as in Ex. 1-5 except that the compound 6-7 obtained in Ex. 10-2 was used instead of the compound 6-1, 5.1 g (yield: 91%) of compound 2-10 was obtained.

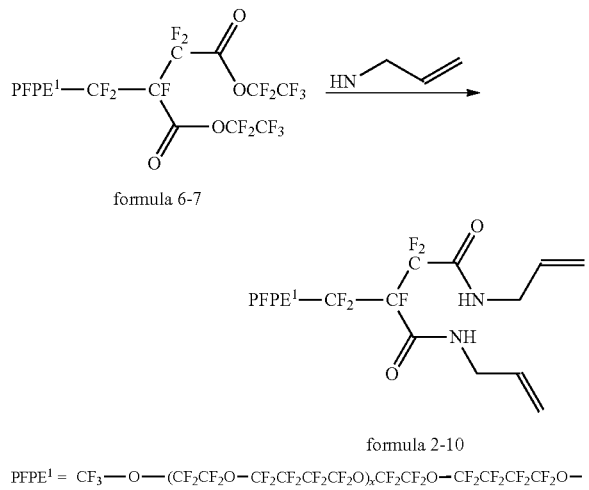

NMR spectrum of compound 2-10:
$^{1}$H-NMR (300.4 MHz, solvent: CDCl$_3$, reference: TMS) δ (ppm): 5.8 (2H), 5.2 (4H), 4.0 (4H).
$^{19}$F-NMR (282.7 MHz, solvent: CDCl$_3$, reference: CFCl$_3$) δ (ppm): −55 (3F), −83 (54F), −88 (50F), −91 (2F), −120 to 130 (57F).
Mean value of unit number x: 13.

Ex. 10-4

In the same manner as in Ex. 1-6 except that the compound 2-10 obtained in Ex. 10-3 was used instead of the compound 2-1, 1.0 g (yield: 100%) of compound 1-10 was obtained.

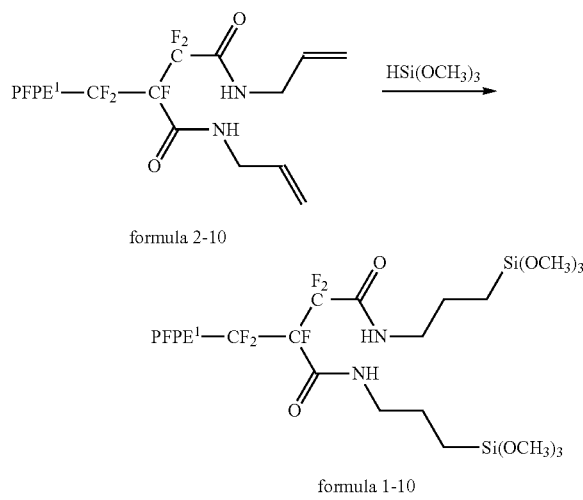

NMR spectrum of compound 1-10:
$^{1}$H-NMR (300.4 MHz, solvent: CDCl$_3$, reference: TMS) δ (ppm): 3.6 (18H), 3.4 (4H), 1.7 (4H), 0.7 (4H).
$^{19}$F-NMR (282.7 MHz, solvent: CDCl$_3$, reference: CFCl$_3$) δ (ppm): −55 (3F), −83 (54F), −88 (50F), −91 (2F), −120 to 130 (57F).
Mean value of unit number x: 13, number average molecular weight of compound 1-10: 4,600.

Ex. 11

Ex. 11-1

Compound 13-1 was obtained in accordance with the method disclosed in Ex. 2-3 in WO2013/121984.

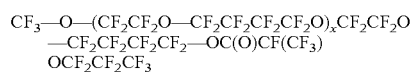

CF$_3$—O—(CF$_2$CF$_2$O—CF$_2$CF$_2$CF$_2$O)$_x$CF$_2$CF$_2$O
—CF$_2$CF$_2$CF$_2$—OC(O)CF(CF$_3$)
OCF$_2$CF$_2$CF$_3$     formula 13-1

Mean value of unit number x: 13.

Ex. 11-2

Into a 500 mL eggplant flask shielded from light with an aluminum foil, 5.8 g of sodium pyrithione and 100 mL of 1,3-bistrifluoromethylbenzene (manufactured by AGC Seimi Chemical Co., Ltd., tradename: SR-solvent) were put, followed by stirring under cooling in an ice bath. Then, 50.0 g of the compound 13-1 obtained in Ex. 11-1 was slowly added, followed by stirring for 2 hours in the ice bath as it was. 12.0 g of iodine and 1.8 g of 2,2-azobis(2-methylbutyronitrile) (manufactured by Wako Pure Chemical Industries, Ltd., tradename: V-59) were put, and the aluminum foil for shielding was removed, followed by stirring at 85° C. overnight. The temperature was returned to 25° C., methanol was added, followed by sufficient stirring, and AC-6000 was added for separation into two layers, the lower layer was recovered, and the solvent was distilled off. The obtained reaction crude liquid was purified by silica gel column chromatography to obtain 39.8 g (yield: 84%) of compound 14-1.

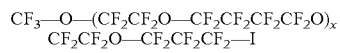

CF$_3$—O—(CF$_2$CF$_2$O—CF$_2$CF$_2$CF$_2$O)$_x$
CF$_2$CF$_2$O—CF$_2$CF$_2$CF$_2$—I     formula 14-1

NMR spectrum of compound 14-1:
$^{19}$F-NMR (282.7 MHz, solvent: CDCl$_3$, reference: CFCl$_3$) δ (ppm): −55 (3F), −58 (2F), −83 (50F), −88 (52F), −90 (2F), −116 (2F), −125 (52F).
Mean value of unit number x: 13.

Ex. 11-3

Into a 500 mL eggplant flask, 10 g of compound 20-3 (manufactured by Combi-Blocks Inc.), 21 g of potassium carbonate and 180 mL of N,N-dimethylformamide were put, followed by stirring under cooling in an ice bath. Then, 14.2 g of allyl bromide was put, followed by stirring at 60° C. overnight. Then, water was put in the reaction system, followed by stirring, and ethyl acetate and hexane were put, followed by washing with water. The organic layer was concentrated, and the residue was purified by silica gel column chromatography to obtain 12.1 g (yield: 92%) of compound 20-4.

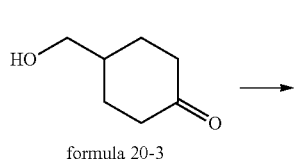

formula 20-3 formula 20-4

NMR spectrum of compound 20-4:

¹H-NMR (300.4 MHz, solvent: CDCl₃, reference: TMS) δ (ppm): 6.0 (1H), 5.1 (2H), 4.1 to 3.9 (2H), 3.3 to 3.1 (2H), 2.5 to 1.9 (9H), 1.6 to 1.4 (2H).

Ex. 11-4

Into a 50 mL eggplant flask, 3.0 g of the compound 14-1 obtained in Ex. 11-2, 1.0 g of the compound 20-4 obtained in Ex. 11-3, 12 mL of SR-solvent and 11 mg of V-59 were put, followed by stirring at 85° C. for two days. During stirring, 10 mg of V-59 was put dividedly in two times. The reaction temperature was returned to 25° C., methanol was added, followed by sufficient stirring, AC-6000 was added for separation into two layers, the lower layer was recovered, and the solvent was distilled off. The obtained reaction crude liquid was purified by silica gel column chromatography to obtain 2.3 g (yield: 75%) of compound 15-1.

formula 14-1 formula 20-4 formula 15-1

$G^2 = CF_3-O-(CF_2CF_2O-CF_2CF_2CF_2CF_2O)_xCF_2CF_2O-CF_2CF_2CF_2-$

NMR spectrum of compound 15-1:

¹H-NMR (300.4 MHz, solvent: CDCl₃, reference: TMS) δ (ppm): 4.3 to 3.3 (7H), 2.5 to 1.9 (7H), 1.6 to 1.4 (2H).

¹⁹F-NMR (282.7 MHz, solvent: CDCl₃, reference: CFCl₃) δ (ppm): −55 (3F), −81 to −83 (50F) −88 (52F), −90 (2F), −110 to −115 (2F), −125 to −127 (52F).

Mean value of unit number x: 13.

Ex. 11-5

Into a 100 mL eggplant flask, 2.3 g of the compound 15-1 obtained in Ex. 11-4, 30 mL of AK-225 and 0.31 g of m-chloroperbenzoic acid were put, followed by stirring at 25° C. overnight. Then, methanol was added, followed by sufficient stirring, and AC-6000 was added for separation into two layers. The lower layer was concentrated, and the residue was purified by silica gel column chromatography to obtain 2.22 g (yield: 96%) of compound 16-1.

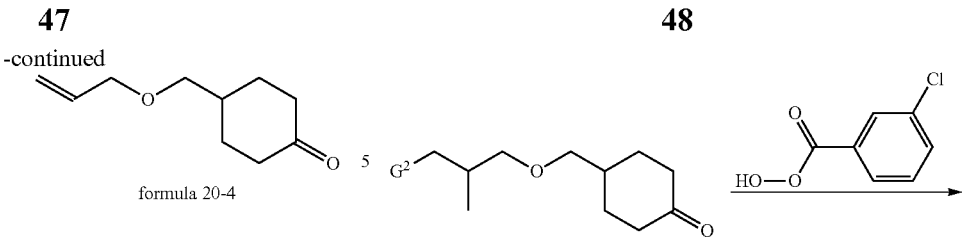

formula 15-1 formula 16-1

$G^2 = CF_3-O-(CF_2CF_2O-CF_2CF_2CF_2CF_2O)_xCF_2CF_2O-CF_2CF_2CF_2-$

NMR spectrum of compound 16-1:

¹H-NMR (300.4 MHz, solvent: CDCl₃, reference: TMS) δ (ppm): 4.4 to 3.2 (9H), 2.5 to 2.0 (2H), 1.9 to 1.3 (5H).

¹⁹F-NMR (282.7 MHz, solvent: CDCl₃, reference: CFCl₃) δ (ppm): −55 (3F), −81 to −83 (50F) −88 (52F), −90 (2F), −110 to −115 (2F), −125 to −127 (52F).

Mean value of unit number x: 13.

Ex. 11-6

Into a 100 mL eggplant flask, 2.2 g of the compound 16-1 obtained in Ex. 11-5, 15 mL of tetrahydrofuran and 15 mL of AK-225 were put, followed by stirring under cooling in an ice bath. Then, 60 mg of lithium aluminum hydride was slowly added, and after completion of addition, the reaction temperature was raised to 25° C., followed by stirring overnight. The eggplant flask was cooled in an ice bath, 0.2 mL of a saturated sodium sulfate aqueous solution was put, and the precipitated solid was removed by celite filtration. The obtained filtrate was concentrated and dissolved in AK-225, and anhydrous magnesium sulfate was put, followed by stirring. Then, the solid was removed by filtration, and the filtrate was concentrated to obtain 1.93 g (yield: 87%) of compound 17-1.

formula 16-1 formula 17-1

$G^2 = CF_3-O-(CF_2CF_2O-CF_2CF_2CF_2CF_2O)_xCF_2CF_2O-CF_2CF_2CF_2-$

NMR spectrum of compound 17-1:

¹H-NMR (300.4 MHz, solvent: CDCl₃, reference: TMS) δ (ppm): 4.0 to 3.2 (10H), 1.7 to 1.0 (9H).

¹⁹F-NMR (282.7 MHz, solvent: CDCl₃, reference: CFCl₃) δ (ppm): −55 (3F), −81 to −83 (50F) −88 (52F), −90 (2F), −113 (2F), −125 to −127 (52F).

Mean value of unit number x: 13.

Ex. 11-7

Into a 100 mL eggplant flask, 1.9 g of the compound 17-1 obtained in Ex. 11-6, 25 mL of AK-225 and 80 mg of sodium fluoride were put, followed by stirring under cooling in an ice bath. Then, 0.38 g of $CF_3CF_2CF_2OCF(CF_3)COF$ was slowly added, and after completion of addition, the mixture was stirred under reflux with heating overnight. Then, the solid was removed by filtration, the filtrate was concentrated, and the obtained reaction crude liquid was purified by silica gel column chromatography to obtain 2.16 g (yield: 97%) of compound 5-8.

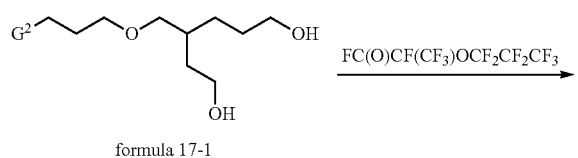

formula 17-1

Ex. 11-8

Into a 500 mL nickel reactor, 250 mL of CFE-419 was put, and nitrogen was blown in. After the oxygen concentration was sufficiently lowered, a 20% fluorine gas (diluted with nitrogen) was blown in for one hour. The exhaust gas was neutralized with an alkali. A CFE-419 solution (5 mass %, mass of compound 5-8: 2.0 g) of the compound 5-8 obtained in Ex. 11-7 was added over a period of 2 hours. The ratio of the fluorine introduction rate (mol/hr) to the introduction rate (mol/hr) of H atoms in the compound 5-8 was adjusted to be 2:1. After addition of the compound 5-8, a CFE-419 solution (0.1 mass %) containing 0.5 g of benzene was intermittently charged. After charging of benzene, a fluorine gas was blown in for one hour, and finally the system in the reactor was sufficiently replaced with a nitrogen gas. The solvent was distilled off, and the obtained reaction crude liquid was diluted with AK-225, and 0.5 g of sodium fluoride and 5.0 g of methanol were put, followed by stirring for one hour. Then, the solid was removed by filtration, and the filtrate was concentrated to obtain 1.74 g (yield: 89%) of compound 6-8.

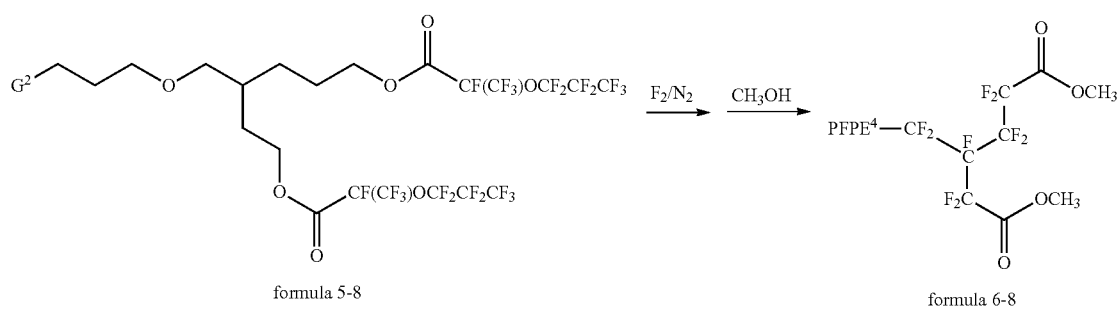

formula 5-8 → formula 6-8

$G^2 = CF_3-O-(CF_2CF_2O-CF_2CF_2CF_2CF_2O)_xCF_2CF_2O-CF_2CF_2CF_2-$ $PFPE^4 = CF_3-O-(CF_2CF_2O-CF_2CF_2CF_2CF_2O)_xCF_2CF_2O-CF_2CF_2CF_2CF_2CF_2CF_2O-$

-continued

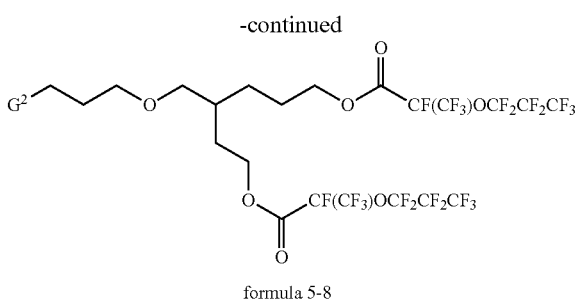

formula 5-8

$G^2 = CF_3-O-(CF_2CF_2O-CF_2CF_2CF_2CF_2O)_xCF_2CF_2O-CF_2CF_2CF_2-$

NMR spectrum of compound 5-8:
$^1$H-NMR (300.4 MHz, solvent: $CDCl_3$, reference: TMS) δ (ppm): 4.0 to 3.2 (8H), 2.8 to 2.4 (2H), 1.7 to 1.0 (9H).

$^{19}$F-NMR (282.7 MHz, solvent: $CDCl_3$, reference: $CFCl_3$) δ (ppm): −55 (3F), −78 to −79 (2F), −80 (12F), −81 to −83 (50F), −86 to 87 (2F), −88 (52F), −90 (2F), −113 (2F), −125 to −127 (52F), −129 (4F) −131 (2F).

Mean value of unit number x: 13.

NMR spectrum of compound 6-8:
$^1$H-NMR (300.4 MHz, solvent: $CDCl_3$, reference: TMS) δ (ppm): 3.9 (6H).

$^{19}$F-NMR (282.7 MHz, solvent: $CDCl_3$, reference: $CFCl_3$) δ (ppm): −55 (3F), −81 to −83 (54F) −88 (52F), −90 (2F), −117 to −120 (4F), −125 to −127 (58F), −183 to −189 (1H).

Mean value of unit number x: 13.

Ex. 11-9

Into a 50 mL eggplant flask, 1.7 g of the compound 6-8 obtained in Ex. 11-8, 5.0 mL of AC-6000 and 60 mg of allylamine were put, followed by stirring at 110° C. overnight. Then, methanol was put, followed by sufficient stirring, and separation into two layers was carried out, and the lower layer was recovered and concentrated. The obtained reaction crude liquid was purified by silica gel column chromatography to obtain 1.48 g (yield: 85%) of compound 2-11.

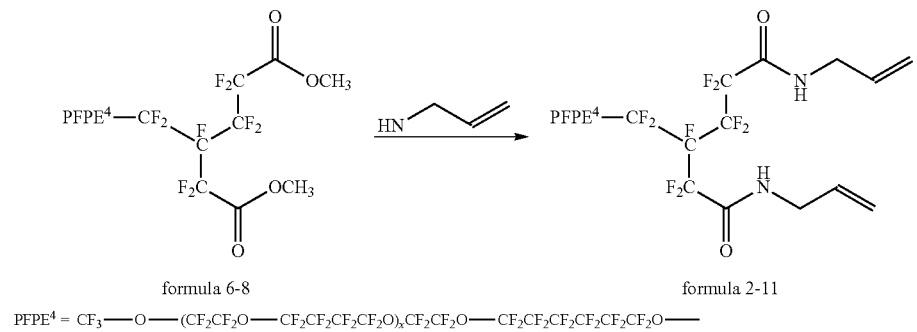

formula 6-8 → formula 2-11

PFPE⁴ = CF₃—O—(CF₂CF₂O—CF₂CF₂CF₂CF₂O)ₓCF₂CF₂O—CF₂CF₂CF₂CF₂CF₂CF₂O—

NMR spectrum of compound 2-11:
¹H-NMR (300.4 MHz, solvent: CDCl₃, reference: TMS) δ (ppm): 5.8 (2H), 5.2 to 5.0 (4H), 4.3 to 4.0 (4H).
¹⁹F-NMR (282.7 MHz, solvent: CDCl₃, reference: CFCl₃) δ (ppm): −55 (3F), −81 to −83 (54F) −88 (52F), −90 (2F), −118 to −120 (4F), −125 to −127 (58F), −183 to −189 (1H).
Mean value of unit number x: 13.

Ex. 11-10

Into a 50 mL eggplant flask, 1.0 g of compound 2-11, 0.084 g of trimethoxysilane, 0.0010 g of aniline, 1.0 g of AC-6000 and 0.0033 g of a platinum/1,3-divinyl-1,1,3,3-tetramethyldisiloxane complex were put, followed by stirring at 25° C. overnight. The reaction mixture was concentrated to obtain 1.0 g (yield: 100%) of compound 1-11.

Mean value of unit number x1: 21, mean value of unit number x2: 20, number average molecular weight: 4,200.

Ex. 12-2

In the same manner as in Ex. 1-2 except that the compound 3-2 obtained in Ex. 12-1 was used instead of the compound 3-1, 10.1 g (yield: 99%) of compound 4-2 was obtained.

$$CF_3CF_2CF_2O—CHFCF_2O—CH_2CF_2O—\{(CF_2O)_{x1}(CF_2CF_2O)_{x2}\}—CF_2CH_2—OSO_2CF_3 \quad \text{formula 4-2}$$

NMR spectrum of compound 4-2:
¹H-NMR (300.4 MHz, solvent: CDCl₃, reference: TMS) δ (ppm): 3.9 (2H), 4.5 (2H), 5.8 to 6.0 (1H).

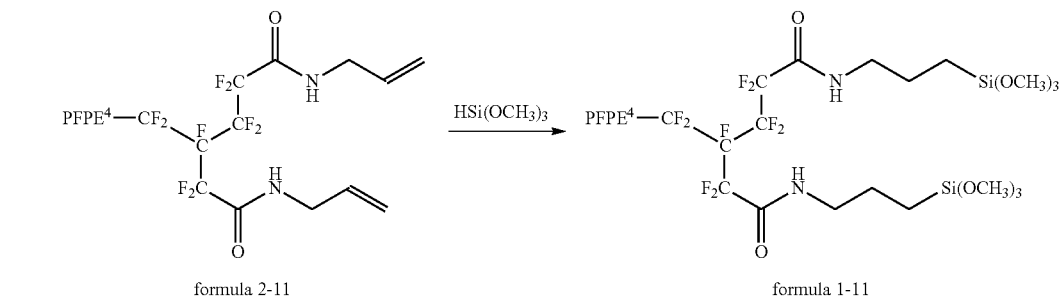

formula 2-11 → formula 1-11

PFPE⁴ = CF₃—O—(CF₂CF₂O—CF₂CF₂CF₂CF₂O)ₓCF₂CF₂O—CF₂CF₂CF₂CF₂CF₂CF₂O—

NMR spectrum of compound 1-11:
¹H-NMR (300.4 MHz, solvent: CDCl₃, reference: TMS) δ (ppm): 3.8 to 3.2 (2H), 1.5 to 0.7 (8H).
¹⁹F-NMR (282.7 MHz, solvent: CDCl₃, reference: CFCl₃) δ (ppm): −55 (3F), −81 to −83 (54F) −88 (52F), −90 (2F), −118 to −120 (4F), −125 to −127 (58F), −183 to −189 (1H).
Mean value of unit number x: 13, number average molecular weight of compound 1-11: 5,500.

Ex. 12

Ex. 12-1

Compound 3-2 was obtained in accordance with the method as disclosed in Ex. 11-1 to 11-5 in WO2014/163004.

$$CF_3CF_2CF_2O—CHFCF_2O—CH_2CF_2O—\{(CF_2O)_{x1}(CF_2CF_2O)_{x2}\}CF_2CH_2—OH \quad \text{formula 3-2}$$

¹⁹F-NMR (282.7 MHz, solvent: CDCl₃, reference: CFCl₃) δ (ppm): −52 to −56 (42F), −79 (1F), −81 (2F), −82 (3F), −84 (1F), −85 to −88 (2F), −89 to −91 (82F), −131 (2F), −145 (1F).

Mean value of unit number x1: 21, mean value of unit number x2: 20.

Ex. 12-3

In the same manner as in Ex. 1-3 except that the compound 4-2 obtained in Ex. 12-2 was used instead of the compound 4-1, 7.2 g (yield: 68%) of compound 5-9 was obtained.

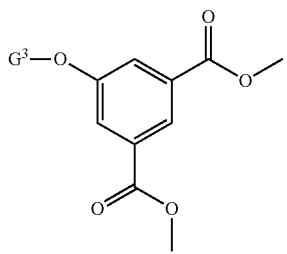

formula 5-9

G³ =
CF₃CF₂CF₂—O—CHFCF₂O—CH₂CF₂O—((CF₂O)ₓ₁(CF₂CF₂O)ₓ₂)—CF₂CH₂—

NMR spectrum of compound 5-9:

¹H-NMR (300.4 MHz, solvent: CDCl₃, reference: TMS) δ (ppm): 3.9 (8H), 4.5 (2H), 5.8 to 6.0 (1H), 7.8 (2H), 8.1 (1H).

¹⁹F-NMR (282.7 MHz, solvent: CDCl₃, reference: CFCl₃) δ (ppm): −52 to −56 (42F), −79 (1F), −81 (2F), −82 (3F), −84 (1F), −85 to −88 (2F), −89 to −91 (82F), −131 (2F), −145 (1F).

Mean value of unit number x1: 21, mean value of unit number x2: 20.

Ex. 12-4

In the same manner as in Ex. 1-4 except that the compound 5-9 obtained in Ex. 12-3 was used instead of the compound 5-1, 7.3 g (yield: 89%) of compound 6-9 was obtained.

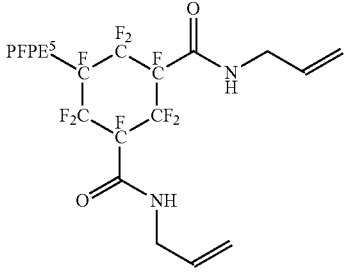

formula 6-9

PFPE⁵ =
CF₃CF₂CF₂—O—CF₂CF₂O—CF₂CF₂O—((CF₂O)ₓ₁(CF₂CF₂O)ₓ₂)—CF₂CF₂O—

NMR spectrum of compound 6-9:

¹⁹F-NMR (282.7 MHz, solvent: CDCl₃, reference: CFCl₃) δ (ppm): −52 to −56 (42F), −57 (6F), −82 (3F), −89 to −91 (92F), −92 (2F), −120 to −131 (11F).

Mean value of unit number x1: 21, mean value of unit number x2: 20.

Ex. 12-5

In the same manner as in Ex. 1-5 except that the compound 6-9 obtained in Ex. 12-4 was used instead of the compound 6-1, 1.0 g (yield: 79%) of compound 2-12 was obtained.

formula 2-12

PFPE⁵ =
CF₃CF₂CF₂—O—CF₂CF₂O—CF₂CF₂O—((CF₂O)ₓ₁(CF₂CF₂O)ₓ₂)—CF₂CF₂O—

NMR spectrum of compound 2-12:

¹H-NMR (300.4 MHz, solvent: CDCl₃, reference: TMS) δ (ppm): 5.8 (2H), 5.2 (4H), 4.0 (4H).

¹⁹F-NMR (282.7 MHz, solvent: CDCl₃, reference: CFCl₃) δ (ppm): −52 to −56 (42F), −82 (3F), −89 to −91 (92F), −92 (2F), −120 to −131 (11F).

Mean value of unit number x1: 21, mean value of unit number x2: 20.

Ex. 12-6

In the same manner as in Ex. 1-6 except that the compound 2-12 obtained in Ex. 12-5 was used instead of the compound 2-1, 1.0 g (yield: 100%) of compound 1-12 was obtained.

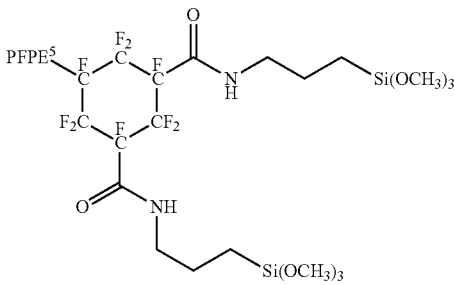

formula 1-12

PFPE⁵ =
CF₃CF₂CF₂—O—CF₂CF₂O—CF₂CF₂O—((CF₂O)ₓ₁(CF₂CF₂O)ₓ₂)—CF₂CF₂O—

NMR spectrum of compound 1-12:

¹H-NMR (300.4 MHz, solvent: CDCl₃, reference: TMS) δ (ppm): 3.6 (18H), 3.4 (4H), 1.7 (4H), 0.7 (4H).

¹⁹F-NMR (282.7 MHz, solvent: CDCl₃, reference: CFCl₃) δ (ppm): −52 to −56 (42F), −82 (3F), −89 to −91 (92F), −92 (2F), −120 to −131 (11F).

Mean value of unit number x1: 21, mean value of unit number x2: 20, number average molecular weight of compound 1-12: 4,900.

Ex. 13

Ex. 13-1

In the same manner as in Ex. 4-1 except that the compound 6-9 obtained in Ex. 12-4 was used instead of the compound 6-1, 25 g (yield: 52%) of compound 7-4 was obtained.

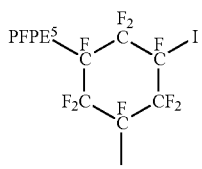

formula 7-4

PFPE$^5$ =
CF$_3$CF$_2$CF$_2$—O—CF$_2$CF$_2$O—CF$_2$CF$_2$O—((CF$_2$O)$_{x1}$(CF$_2$CF$_2$O)$_{x2}$)—CF$_2$CF$_2$O—

NMR spectrum of compound 7-4:
$^{19}$F-NMR (282.7 MHz, solvent: CDCl$_3$, reference: CFCl$_3$) δ (ppm): −52 to −56 (42F), −82 (3F), −89 to −91 (92F), −92 (2F), −120 to −131 (11F).
Mean value of unit number x1: 21, mean value of unit number x2: 20.

Ex. 13-2

In the same manner as in Ex. 4-2 except that the compound 7-4 obtained in Ex. 13-1 was used instead of the compound 7-1, 5.2 g (yield: 100%) of compound 8-4 was obtained.

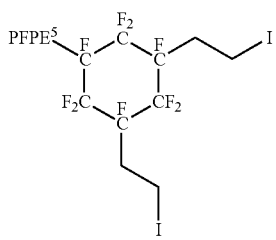

formula 8-4

PFPE$^5$ =
CF$_3$CF$_2$CF$_2$—O—CF$_2$CF$_2$O—CF$_2$CF$_2$O—((CF$_2$O)$_{x1}$(CF$_2$CF$_2$O)$_{x2}$)—CF$_2$CF$_2$O—

NMR spectrum of compound 8-4:
$^1$H-NMR (300.4 MHz, solvent: CDCl$_3$, reference: TMS) δ (ppm): 3.1 (4H), 2.6 (4H).
$^{19}$F-NMR (282.7 MHz, solvent: CDCl$_3$, reference: CFCl$_3$) δ (ppm): −52 to −56 (42F), −82 (3F), −89 to −91 (92F), −92 (2F), −120 to −131 (11F).
Mean value of unit number x1: 21, mean value of unit number x2: 20.

Ex. 13-3

In the same manner as in Ex. 4-3 except that the compound 8-4 obtained in Ex. 13-2 was used instead of the compound 8-1, 4.5 g (yield: 81%) of compound 2-13 was obtained.

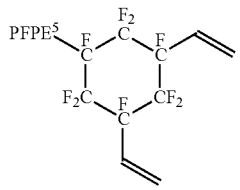

formula 2-13

PFPE$^5$ =
CF$_3$CF$_2$CF$_2$—O—CF$_2$CF$_2$O—CF$_2$CF$_2$O—((CF$_2$O)$_{x1}$(CF$_2$CF$_2$O)$_{x2}$)—CF$_2$CF$_2$O—

NMR spectrum of compound 2-13:
$^1$H-NMR (300.4 MHz, solvent: CDCl$_3$, reference: TMS) δ (ppm): 5.9 (4H), 5.6 (2H).
$^{19}$F-NMR (282.7 MHz, solvent: CDCl$_3$, reference: CFCl$_3$) δ (ppm): −52 to −56 (42F), −82 (3F), −89 to −91 (92F), −92 (2F), −120 to −131 (11F).
Mean value of unit number x1: 21, mean value of unit number x2: 20.

Ex. 13-4

In the same manner as in Ex. 1-6 except that the compound 2-13 obtained in Ex. 13-3 was used instead of the compound 2-1, 1.0 g (yield: 100%) of compound 1-13 was obtained.

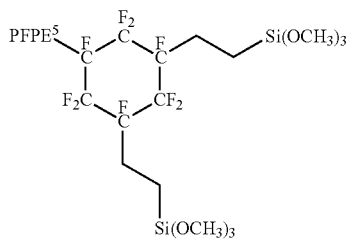

formula 1-13

PFPE$^5$ =
CF$_3$CF$_2$CF$_2$—O—CF$_2$CF$_2$O—CF$_2$CF$_2$O—((CF$_2$O)$_{x1}$(CF$_2$CF$_2$O)$_{x2}$)—CF$_2$CF$_2$O—

NMR spectrum of compound 1-13:
$^1$H-NMR (300.4 MHz, solvent: CDCl$_3$, reference: TMS) δ (ppm): 3.6 (18H), 2.5 (4H), 0.7 (4H).
$^{19}$F-NMR (282.7 MHz, solvent: CDCl$_3$, reference: CFCl$_3$) δ (ppm): −52 to −56 (42F), −82 (3F), −89 to −91 (92F), −92 (2F), −120 to −131 (11F).
Mean value of unit number x1: 21, mean value of unit number x2: 20, number average molecular weight of compound 1-13: 4,700.

Ex. 14

Compound 21-1 was obtained in accordance with the method as disclosed in Ex. 3 in WO2017/038832.

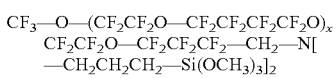

formula 21-1

Ex. 15

Compound 21-2 was obtained in accordance with the method as disclosed in Example 6 in WO2013/121984.

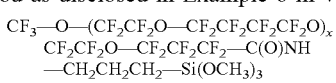

formula 21-2

Ex. 21 to 35: Production and Evaluation of Article

Using the compound obtained in each of Ex. 1 to 15, a substrate was surface-treated to obtain an article in each of Ex. 21 to 35. As the surface treatment method, in each Ex., the following dry coating method and wet coating method were respectively employed. As the substrate, chemically tempered glass was used. With respect to the obtained article, evaluations were carried out by the following methods. The results are shown in Tables 1 and 2.

(Dry Coating Method)

The dry coating was carried out by using a vacuum deposition apparatus (manufactured by ULVAC Co., VTR 350M) (vacuum deposition method). 0.5 g of the compound obtained in each of Ex. 1 to 15 was filled in a boat made of molybdenum in the vacuum deposition apparatus, and inside of the vacuum deposition apparatus was evacuated to a level of at most $1 \times 10^{-3}$ Pa. The boat having the compound placed therein was heated at a temperature raising rate of at most 10° C./min, and at the time when the vapor deposition rate by a quartz oscillator film thickness meter exceeded 1 nm/sec, the shutter was opened to initiate film deposition on the surface of a substrate. When the film thickness became about 50 nm, the shutter was closed to terminate film deposition on the surface of the substrate. The substrate on which the compound was deposited, was subjected to heat treatment at 200° C. for 30 minutes, followed by washing with dichloropentafluoropropane (manufactured by Asahi Glass Company, Limited, AK-225 to obtain an article having a surface layer on the surface of the substrate.

(Wet Coating Method)

The compound obtained in each of Ex. 1 to 15, and $C_4F_9OC_2H_5$ (manufactured by 3M, Novec (registered trademark) 7200) as a medium, were mixed to prepare a coating liquid having a solid content concentration of 0.05%. A substrate was dipped in the coating liquid and allowed to stand for 30 minutes, whereupon the substrate was taken out (dip coating method). The coating film was dried at 200° C. for 30 minutes and washed with AK-225, to obtain an article having a surface layer on the surface of the substrate.

(Evaluation Methods)

<Method for Measuring Contact Angle>

The contact angle of about 2 μL of distilled water or n-hexadecane placed on the surface of the surface layer, was measured by using a contact angle measuring apparatus (manufactured by Kyowa Interface Science Co., Ltd., DM-500). Measurements were conducted at five different points on the surface of the surface layer, and the average value was calculated. For the calculation of the contact angle, a 2θ method was employed.

<Initial Contact Angle>

With respect to the surface layer, the initial water contact angle and the initial n-hexadecane contact angle were measured by the above-described measuring method. The evaluation standards are as follows.

Initial water contact angle:

⊚ (excellent): at least 115 degrees.

○ (good): at least 110 degrees and less than 115 degrees.

Δ (acceptable): at least 100 degrees and less than 110 degrees.

x (poor): less than 100 degrees.

Initial n-hexadecane contact angle:

⊚ (excellent): at least 66 degrees.

○ (good): at least 65 degrees and less than 66 degrees.

Δ (acceptable): at least 63 degrees and less than 65 degrees.

x (poor): less than 63 degrees.

<Light Resistance>

To the surface layer, by means of a tabletop xenon arc lamp type accelerated light resistance testing machine (manufactured by Toyo Seiki Seisaku-sho, Ltd., SUNTEST XLS+), light (650 W/m$^2$, 300 to 700 nm) was applied at a black panel temperature of 63° C. for 1,000 hours, whereupon the water contact angle was measured. The smaller the decrease in water contact angle after the accelerated light resistance test, the smaller the decrease in performance due to light, and the better the light resistance. The evaluation standards are as follows.

⊚ (excellent): The change in water contact angle after the accelerated light resistance test is at most 2 degrees.

○ (good): The change in water contact angle after the accelerated light resistance test is more than 2 degrees and at most 5 degrees.

Δ (acceptable): The change in water contact angle after the accelerated light resistance test is more than 5 degrees and at most 10 degrees.

x (poor): The change in water contact angle after the accelerated light resistance test is more than 10 degrees.

<Abrasion Resistance (Steel Wool)>

With respect to the surface layer, in accordance with JIS L0849: 2013 (ISO 105-X12: 2001), using a reciprocating traverse testing machine (manufactured by KNT Co.), steel wool Bon Star (#0000) was reciprocated 10,000 times under a pressure of 98.07 kPa at a speed of 320 cm/min, whereupon the water contact angle was measured. The smaller the decrease in water repellency (water contact angle) after the friction, the smaller the decrease in performance due to friction, and the better the abrasion resistance. The evaluation standards are as follows.

⊚ (excellent): The change in water contact angle after reciprocation of 10,000 times is at most 5 degrees.

○ (good): The change in water contact angle after reciprocation of 10,000 times is more than 5 degrees and at most 10 degrees.

Δ (acceptable): The change in water contact angle after reciprocation of 10,000 times is more than 10 degrees and at most 20 degrees.

x (poor): The change in water contact angle after reciprocation of 10,000 times is more than 20 degrees.

<Chemical Resistance (Alkali Resistance)>

The article was immersed in a 1N aqueous sodium hydroxide solution (pH: 14) for 5 hours, then washed with water and air-dried, whereupon the water contact angle was measured. The smaller the decrease in water contact angle after the test, the smaller the decrease in performance due to alkali, and the better the alkali resistance. The evaluation standards are as follows.

⊚ (excellent): The change in water contact angle after the alkali resistance test is at most 2 degrees.

○ (good): The change in water contact angle after the alkali resistance test is more than 2 degrees and at most 5 degrees.

Δ (acceptable): The change in water contact angle after the alkali resistance test is more than 5 degrees and at most 10 degrees.

x (poor): The change in water contact angle after the alkali resistance test is more than 10 degrees.

<Chemical Resistance (Salt Water Resistance)>

The salt spray test was carried out in accordance with JIS H8502. That is, the article was exposed to salt atmosphere in a salt spray tester (manufactured by Suga Test Instruments Co., Ltd.) for 300 hours, and then, the water contact angle was measured. The smaller the decrease in water contact angle after the test, the smaller the decrease in performance due to salt water, and the better the salt water resistance. The evaluation standards are as follows.

⊚ (excellent): The change in water contact angle after the salt spray test is at most 2 degrees.

○ (good): The change in water contact angle after the salt spray test is more than 2 degrees and at most 5 degrees.

Δ (acceptable): The change in water contact angle after the salt spray test is more than 5 degrees and at most 10 degrees.

x (poor): The change in water contact angle after the salt spray test is more than 10 degrees.

<Fingerprint Stain Removability>

An artificial fingerprint liquid (liquid consisting of oleic acid and squalene) was deposited on a flat surface of a silicon rubber plug, and then, extra oil was wiped off by a nonwoven fabric (manufactured by Asahi Kasei Corporation, BEMCOT (registered trademark) M-3), to prepare a stamp for fingerprint. The fingerprint stamp was placed on the surface layer and pressed under a load of 9.8 N for 10 seconds. The haze at a portion having a fingerprint put, was measured by a haze meter and taken as an initial value. With respect to the portion having a fingerprint put, using a reciprocating traverse testing machine (manufactured by KNT Co.) having tissue paper attached, wiping was carried out under a load of 4.9 N. The value of haze was measured every one reciprocation for wiping, and the number of wiping times until the haze became at most 10% of the initial value, was measured. The smaller the number of wiping times, the easier the removal of fingerprint stain, and the better the fingerprint stain removability. The evaluation standards are as follows.

⊚ (excellent): The number of wiping times is at most 3 times.

○ (good): The number of wiping times is from 4 to 5 times.

Δ (acceptable): The number of wiping times is from 6 to 8 times.

x (poor): The number of wiping times is at least 9 times.

TABLE 1

| | Ex. | | 21 | 22 | 23 | 24 | 25 | 26 | 27 | 28 |
|---|---|---|---|---|---|---|---|---|---|---|
| | Fluorinated ether compound | | Compound 1-1 | Compound 1-2 | Compound 1-3 | Compound 1-4 | Compound 1-5 | Compound 1-6 | Compound 1-7 | Compound 1-8 |
| Dry coating method | Initial contact angle | Water | ⊚ | ⊚ | ⊚ | ⊚ | ⊚ | ⊚ | ⊚ | ⊚ |
| | | n-Hexadecane | ⊚ | ⊚ | ⊚ | ⊚ | ⊚ | ⊚ | ⊚ | ⊚ |
| | Light resistance | | Δ | Δ | ○ | ⊚ | ⊚ | ⊚ | ○ | ○ |
| | Abrasion resistance (steel wool) | | ○ | ○ | ○ | ○ | ○ | ⊚ | ○ | ○ |
| Wet coating method | Initial contact angle | Water | ⊚ | ⊚ | ⊚ | ⊚ | ⊚ | ⊚ | ⊚ | ⊚ |
| | | n-Hexadecane | ⊚ | ⊚ | ⊚ | ⊚ | ⊚ | ⊚ | ⊚ | ⊚ |
| | Light resistance | | Δ | Δ | ○ | ⊚ | ⊚ | ⊚ | ○ | ○ |
| | Abrasion resistance (steel wool) | | ○ | ○ | ○ | ○ | ○ | ⊚ | ○ | ○ |
| | Chemical resistance | Alkali resistance | ○ | ○ | ○ | ⊚ | ⊚ | ⊚ | ○ | ○ |
| | | Salt water resistance | ⊚ | ⊚ | ⊚ | ⊚ | ⊚ | ⊚ | ⊚ | ⊚ |
| | Fingerprint stain removability | | ⊚ | ⊚ | ⊚ | ⊚ | ⊚ | ⊚ | ⊚ | ⊚ |

TABLE 2

| | Ex. | | 29 | 30 | 31 | 32 | 33 | 34 | 35 |
|---|---|---|---|---|---|---|---|---|---|
| | Fluorinated ether compound | | Compound 1-9 | Compound 1-10 | Compound 1-11 | Compound 1-12 | Compound 1-13 | Compound 21-1 | Compound 21-2 |
| Dry coating method | Initial contact angle | Water | ⊚ | ⊚ | ⊚ | ⊚ | ⊚ | ⊚ | ⊚ |
| | | n-Hexadecane | ⊚ | ⊚ | ⊚ | ⊚ | ⊚ | ⊚ | ⊚ |
| | Light resistance | | ○ | ○ | ○ | ○ | ⊚ | X | Δ |
| | Abrasion resistance (steel wool) | | ○ | ○ | ○ | Δ | ○ | Δ | X |
| Wet coating method | Initial contact angle | Water | ⊚ | ⊚ | ⊚ | ⊚ | ⊚ | ⊚ | ⊚ |
| | | n-Hexadecane | ⊚ | ⊚ | ⊚ | ⊚ | ⊚ | ⊚ | ⊚ |
| | Light resistance | | ○ | ○ | ○ | ○ | ⊚ | X | Δ |
| | Abrasion resistance (steel wool) | | ○ | ○ | ○ | Δ | ○ | Δ | X |
| | Chemical resistance | Alkali resistance | ○ | ○ | ○ | ○ | ⊚ | X | X |
| | | Salt water resistance | ⊚ | ⊚ | ⊚ | ⊚ | ⊚ | ○ | ○ |
| | Fingerprint stain removability | | ⊚ | ⊚ | ⊚ | ⊚ | ⊚ | ⊚ | ⊚ |

It was confirmed that in Ex. 21 to 33 in which the compound 1 was used, the initial water/oil repellency, abrasion resistance, fingerprint stain removability, light resistance and chemical resistance were excellent.

In Ex. 34 and 35 in which conventional fluorinated ether compounds were used, abrasion resistance, light resistance and chemical resistance were inferior.

INDUSTRIAL APPLICABILITY

The fluorinated ether compound of the present invention is useful for various applications for which it is required to impart lubricity and water/oil repellency. For example, it may be used for a display input device such as a touch panel, surface protective coating on a transparent glass or transparent plastic member, kitchen antifouling coating, water repellent moistureproof coating or antifouling coating on electronic device, a heat exchanger or a battery, toiletry antifouling coating, coating on a member which requires liquid repellency while conducting electricity, water repellent/waterproof/water sliding coating on a heat exchanger, or a surface low friction coating on the inside of a vibrating strainer or a cylinder, etc. More specific examples of application include a front protective plate, an antireflection plate, a polarizing plate, an antiglare plate or a surface thereof having an antireflection film, of a display, an apparatus having a display input device of which the screen is operated by human fingers or hands, such as a touch panel sheet or a touch panel display of an apparatus such as a mobile phone or a personal digital assistant, a decorative building material for restroom, bathroom, lavatory, kitchen and the like, waterproof coating for a wiring board, water repellent/waterproof coating on a heat exchanger, water repellent coating on a solar cell, waterproof/water repellent coating on a printed wiring board, waterproof/water repellent coating for an electronic equipment casing or an electronic member, insulating property-improving coating on a power transmission line, waterproof/water repellent coating on a filter, waterproof coating on an electromagnetic wave absorption material or an acoustic material, antifouling coating for bathroom, kitchen instrument and toiletry, water repellent/waterproof/water sliding coating on a heat exchanger, surface low-friction coating on the inside of a vibrating strainer or a cylinder, surface protective coating on a machine component, a vacuum apparatus component, a bearing component, an automobile component, an industrial tool, etc.

This application is a continuation of PCT Application No. PCT/JP2018/030223, filed on Aug. 13, 2018, which is based upon and claims the benefit of priority from Japanese Patent Application No. 2017-167999 filed on Aug. 31, 2017. The contents of those applications are incorporated herein by reference in their entireties.

What is claimed is:

1. A fluorinated ether compound, which is a compound of formula 1:

formula 1 wherein A is a $C_{1-20}$ perfluoroalkyl group,
$R^{f1}$ is a perfluoroalkylene group,
m is an integer of from 2 to 500,
$R^{f1}O)_m$ may be two or more types of $R^{f1}O$ differing in the number of carbon atoms,
$Q^1$ is a (b+1) valent perfluorohydrocarbon group in which one or more of fluorine atoms may be substituted by a hydroxy group provided that the fluorine atom bonded to the carbon atom bonded to $R^1$ is not substituted by a hydroxy group,
$R^1$ is a monovalent organic group having at least one hydrolyzable silyl group excluding once having an etheric oxygen atom,
b is an integer of at least 2, and
the b $R^1$ may be the same or different.

2. The fluorinated ether compound according to claim 1, wherein b is 2, and
$Q^1$ is a group represented by the following formula g1, g2 or g3:

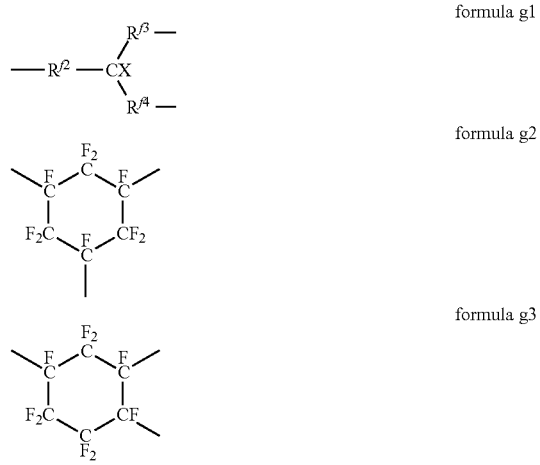

wherein X is a fluorine atom, a perfluoroalkyl group or a hydroxy group, $R^{f2}$ is a single bond or a perfluoroalkylene group bonded to the terminal oxygen atom of $(R^{f1} O)_m$, $R^{f3}$ and $R^{f4}$ are a single bond or a perfluoroalkylene group bonded to $R^1$, at least one of $R^{f2}$, $R^{f3}$ and $R^{f4}$ is a perfluoroalkylene group, and when X is a hydroxy group, $R^{f3}$ and $R^{f4}$ are a perfluoroalkylene group bonded to $R^1$.

3. The fluorinated ether compound according to claim 1, wherein $R^1$ is a group represented by the following formula g4:

formula g4 wherein Z is a single bond or —C(O)N($R^2$)—,
$R^2$ is a hydrogen atom or an alkyl group,
$Q^2$ is a (p+1) valent organic group (provided that it is an organic group having no hydrolyzable silyl group nor etheric oxygen atom),
$R^3$ is a monovalent hydrocarbon group,
L is hydrolyzable group,
n is an integer of from 0 to 2,
p is an integer of at least 1, and
when p is at least 2, the p [-SiR$^3$$_n$L$_{3-n}$] may be the same or different.

4. The fluorinated ether compound according to claim 3, wherein $Q^2$ is a (p+1) valent hydrocarbon group.

5. A fluorinated ether composition comprising at least one type of the fluorinated ether compound as defined in claim 1, and other fluorinated ether compound.

6. A coating liquid comprising the fluorinated ether compound as defined claim 1, and a liquid medium.

7. An article comprising a substrate and a surface layer formed of the fluorinated ether compound as defined in claim 1 on a surface of the substrate.

8. The article according to claim 7, which has the surface layer on a surface of a member constituting a plane to be touched with fingers of a touch panel.

9. A method for producing an article, which comprises treating a surface of a substrate by dry coating method using the fluorinated ether compound as defined in claim 1 to form a surface layer formed of the fluorinated ether compound on the surface of the substrate.

10. A method for producing an article, which comprises applying the coating liquid as defined in claim 6 to a surface of a substrate by wet coating method, followed by drying to form a surface layer formed of the fluorinated ether compound on the surface of the substrate.

* * * * *